(12) United States Patent
Yoshida

(10) Patent No.: US 8,376,352 B2
(45) Date of Patent: Feb. 19, 2013

(54) SHEET FEEDING APPARATUS AND PRINTING APPARATUS WITH SHEET STORAGE UNIT

(75) Inventor: Naoki Yoshida, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/962,530

(22) Filed: Dec. 7, 2010

(65) Prior Publication Data
US 2011/0187045 A1 Aug. 4, 2011

(30) Foreign Application Priority Data
Jan. 29, 2010 (JP) ................................. 2010-018707

(51) Int. Cl.
*B65H 1/02* (2006.01)
(52) U.S. Cl. .................. 271/149; 271/160; 271/162
(58) Field of Classification Search .................. 271/145, 271/147, 149, 157, 160, 162; 206/449, 455
See application file for complete search history.

(56) References Cited

U.S. PATENT DOCUMENTS

| | | | | |
|---|---|---|---|---|
| 3,912,078 A | * | 10/1975 | Asano | 206/455 |
| 4,828,245 A | * | 5/1989 | Shimogawara | 271/171 |
| 5,065,866 A | * | 11/1991 | Boutet et al. | 206/455 |
| 5,090,567 A | * | 2/1992 | Boutet | 206/455 |
| 5,139,252 A | | 8/1992 | Morita et al. | |
| RE35,341 E | * | 10/1996 | Kikuchi et al. | 271/3.14 |
| 6,318,918 B1 | * | 11/2001 | Sasaki et al. | 400/624 |
| 6,412,772 B1 | * | 7/2002 | Itoh et al. | 271/145 |
| 7,239,416 B2 | | 7/2007 | Ohmura et al. | |

FOREIGN PATENT DOCUMENTS

| | | |
|---|---|---|
| JP | 2514431 B2 | 4/1996 |
| JP | 2001-232909 A | 8/2001 |
| JP | 2001-253122 A | 9/2001 |

* cited by examiner

*Primary Examiner* — Jeremy R Severson
(74) *Attorney, Agent, or Firm* — McGinn IP Law Group, PLLC

(57) ABSTRACT

A sheet feeding apparatus includes: a sheet storage unit into which a sheet is inserted in a generally vertical direction through a sheet inlet, the sheet storage unit having a first opening portion formed on a front of the sheet storage unit, a second opening portion formed on a rear thereof, and a third opening portion formed on a top thereof; a pressure plate having a bottom portion on which the sheet inserted into the sheet storage unit is placed, and a rear portion formed on rear of the bottom portion, the pressure plate being disposed in a manner slidable in front and rear directions; a moving device configured to slide the pressure plate in the front direction so that the rear portion presses the sheet through the second opening portion; and a roller rotatably disposed so as to contact with the sheet through the first opening portion, the roller moving the sheet in a vertical direction in response to rotation of the roller, to output the sheet through the third opening portion.

19 Claims, 24 Drawing Sheets

SHEET FEEDING APPARATUS AND PRINTING APPARATUS WITH SHEET STORAGE UNIT

BACKGROUND OF THE INVENTION

1. Field of the Invention

The presently disclosed subject matter relates to a printing apparatus, and more particularly, to a sheet feeding apparatus and a printing apparatus configured to create a photo print of a three-dimensional image (hereinafter referred to as "3D print").

2. Description of the Related Art

Japanese Patent Application Laid-Open Nos. 2001-232909 and 2001-253122 describe a printer in which paper sheets are set, transported and carried out in a longitudinal direction. Japanese Patent No. 2514431 describes a sheet feeding apparatus for a printer in which a horizontally placed sheet feeding cassette is used, and paper sheets are pushed up from a lower direction and outputted by a roller provided in an upper direction.

SUMMARY OF THE INVENTION

However, in the arts described in Japanese Patent Application Laid-Open Nos. 2001-232909 and 2001-253122, a claw including a complicated link cam mechanism needs to be used to transport and output the paper sheets. Moreover, in the art described in Japanese Patent No. 2514431, since the paper sheets are pushed up from the lower direction, the art is not suitable for transporting and outputting a resin sheet with a certain thickness, stiffness and weight.

The presently disclosed subject matter has been made in view of the above described circumstances, and it is an object of the presently disclosed subject matter to provide a sheet feeding apparatus and a printing apparatus which can transport and output a resin sheet with a certain thickness, stiffness and weight, in a simple structure.

A first aspect of the presently disclosed subject matter provides a sheet feeding apparatus including a box-shaped sheet storage unit into which a resin sheet is inserted in a generally vertical direction through a sheet inlet, the sheet storage unit having a first opening portion formed on a front of the sheet storage unit, a second opening portion formed on a rear of the sheet storage unit, and a third opening portion formed on a top of the sheet storage unit; a generally L-shaped pressure plate having a bottom portion on which the sheet inserted into the sheet storage unit is placed, and a rear portion formed on rear of the bottom portion, the generally L-shaped pressure plate being disposed in a manner slidable in front and rear directions; a moving device configured to slide the pressure plate in the front direction so that the rear portion presses the sheet through the second opening portion; and a roller rotatably disposed so as to contact with the sheet through the first opening portion, the roller moving the sheet in a vertical direction in response to rotation of the roller, to output the sheet through the third opening portion.

According to the sheet feeding apparatus of the first aspect, the resin sheet is inserted into the box-shaped sheet storage unit in the vertical direction, and the inserted sheet is placed on the bottom portion of the pressure plate. When the pressure plate is slid in the front direction, the rear portion of the pressure plate presses the sheet. When the rotatably disposed roller contacts with the sheet through the first opening portion and the roller rotates, the sheet is moved in the vertical direction through the second opening portion, and outputted through the third opening portion. Thereby, the sheet can be outputted from a cassette storage main body by rotation of a feed roller, and can be fed to a transport path. Moreover, since the sheet is placed on the bottom portion, even if a plurality of the sheets are stacked and become heavy (for example, 2 to 4 kg), the sheets can be pressed in the front direction. Moreover, the rear portion is inserted through the second opening portion. Thereby, the rear portion can press the sheet in the front direction after a cassette is loaded.

A second aspect of the presently disclosed subject matter provides the sheet feeding apparatus according to the first aspect, wherein a pushing portion is disposed on the rear portion through an elastic member so as to face the first opening portion, and the sheet feeding apparatus further includes: a coupling device configured to rockably couple the rear portion to the bottom portion; and a pressing device configured to press the rear portion toward the front.

According to the sheet feeding apparatus of the second aspect, the rear portion is rockably coupled to the bottom portion, and the rear portion is pressed toward the front by the pressing device. The pushing portion is disposed on the rear portion through the elastic member so as to face the first opening portion. Thereby, the pushing portion can be used to press the sheet in the front direction.

A third aspect of the presently disclosed subject matter provides the sheet feeding apparatus according to the second aspect, further including: a rocking detection device configured to detect rocking of the rear portion; and a first control device configured to slide the pressure plate in the front direction by the moving device when the rocking is detected by the rocking detection device.

According to the sheet feeding apparatus of the third aspect, when the rocking of the rear portion is detected, the pressure plate is slid in the front direction. Thereby, a position of the pressure plate can be controlled so that the pressure plate constantly presses the sheet with a certain pressure.

A fourth aspect of the presently disclosed subject matter provides the sheet feeding apparatus according to any of the first to third aspects, wherein a flat surface is formed on the roller so that the roller is generally cross-sectionally D-shaped.

According to the sheet feeding apparatus of the fourth aspect, the flat surface is formed on the roller so that the roller is generally cross-sectionally D-shaped. Thereby, when the feed roller is caused to perform one rotation, the sheet can be fed from a sheet feeding cassette by a certain amount.

A fifth aspect of the presently disclosed subject matter provides the sheet feeding apparatus according to the fourth aspect, wherein the sheet storage unit includes a cassette in which a plurality of the sheets are stacked and inserted, and a main body portion in which the cassette is loaded, and the sheet feeding apparatus further includes: a loading detection device configured to detect whether or not the cassette is loaded in the main body portion; a rotation device configured to cause the roller to rotate; a second control device configured to control the rotation device; and a position detection device configured to detect a position of the roller in a rotation direction, and wherein, if the loading detection device detects that the cassette is not loaded in the main body portion, the second control device controls the rotation device to cause the roller to rotate so that the flat surface faces the sheet, based on a result of the detection performed by the position detection device.

According to the sheet feeding apparatus of the fifth aspect, if it is detected that the cassette in which the plurality of the sheets are stacked and inserted is not loaded in the main body portion, the roller is caused to rotate so that the flat surface which is formed so that the roller is generally cross-sectionally D-shaped faces the sheet. Thereby, the roller and the sheet do not interfere with each other, and the cassette, that is, the sheets can be loaded in the main body portion.

A sixth aspect of the presently disclosed subject matter provides the sheet feeding apparatus according to the fifth aspect, wherein a ridge is formed on the cassette, and a groove which engages with the ridge is formed on the main body portion.

According to the sheet feeding apparatus of the sixth aspect, the ridge formed on the cassette and the groove formed on the main body portion engage with each other. Thereby, the cassette can be positioned in the main body portion.

A seventh aspect of the presently disclosed subject matter provides the sheet feeding apparatus according to any of the first to sixth aspects, wherein the third opening portion is formed to have a width which is thicker than a thickness of the sheet and thinner than a thickness of two of the sheets.

According to the sheet feeding apparatus of the seventh aspect, the third opening portion is formed on the top so as to have the width which is thicker than the thickness of the sheet and thinner than the thickness of two of the sheets, and the sheet is outputted through this third opening portion. Thereby, only one sheet can be outputted.

An eighth aspect of the presently disclosed subject matter a printing apparatus including: a sheet feeding apparatus according to any of the first to seventh aspects; and an image forming unit configured to form an image on the sheet outputted from the sheet storage unit by the sheet feeding apparatus.

According to the presently disclosed subject matter, there can be provided the sheet feeding apparatus and the printing apparatus which can transport and output the resin sheet with the certain thickness, stiffness and weight, in the simple structure.

DETAILED DESCRIPTION OF THE PREFERRED EMBODIMENTS

Hereinafter, embodiments of a printing apparatus according to the presently disclosed subject matter will be described according to the accompanying drawings.

[Overall Configuration of Printing Apparatus]

Figure 1:
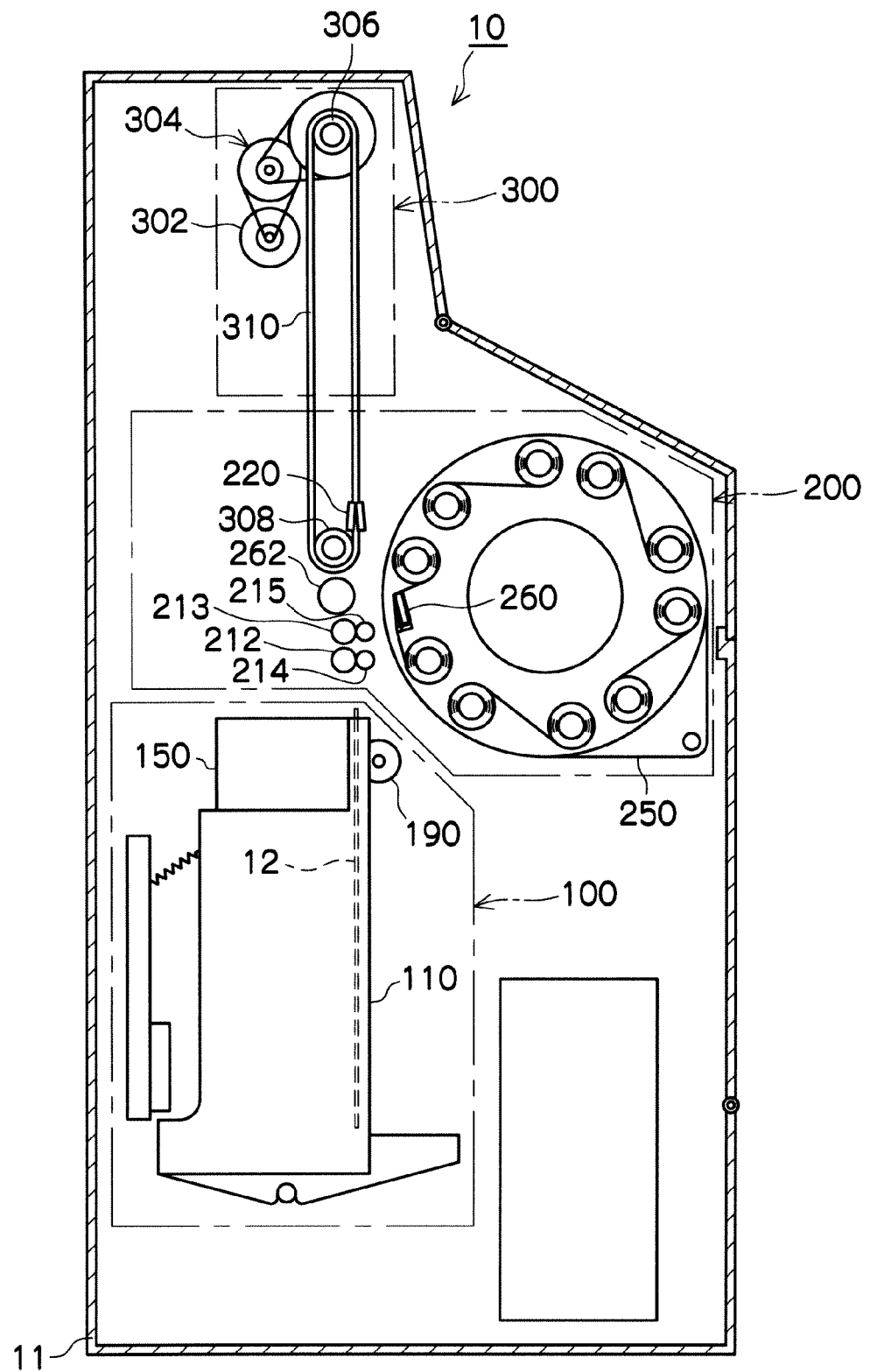
FIG. 1 is an internal perspective view schematically representing an inside of a printing apparatus when a photographic print medium is fed.

FIG. 1 is an internal perspective view schematically representing a printing apparatus 10 according to a first embodiment of the presently disclosed subject matter, and illustrating the printing apparatus 10 in a state where a photographic print medium is fed from a sheet feeding cassette.

As illustrated in FIG. 1, this printing apparatus 10 is a vertically placed 3D printer which transports a transparent resin photographic print medium (hereinafter referred to as "lenticular sheet") 12 in a vertical direction, and performs photographic printing for the lenticular sheet 12. The lenticular sheet 12 includes a lens surface with a so-called lenticular lens having a hog-backed lens group, formed on a surface of the lenticular sheet 12, and a photographic print surface which is on the reverse side of the lens surface. This printing apparatus 10 includes a sheet storage unit 100, a photographic printing unit 200, and a free feeding unit 300. A material of the lenticular sheet 12 includes a heat-resistant, flexible member which is adapted to a photographic printing operation of a thermal head 260. This member is transparent resin, for example, PET (polyethylene terephthalate resin), PMMA (Poly(methyl methacrylate; acrylic resin) or PC (polycarbonate resin). Moreover, the lenticular sheet 12 may have any thickness, for example, 0.3 mm (millimeter).

Moreover, this printing apparatus 10 is a sublimation printer using ink ribbons of R (image receiving layer), Y (yellow), M (magenta), C (cyan) and W (white), in which moving up (in the photographic printing) and moving down (feeding backward to a photographic printing start position) are repeatedly performed for each photographic print color, and a transport path for the lenticular sheet 12 includes the same straight path for both moving up and down.

In this printing apparatus 10, a system controller 400 (see FIG. 18) is disposed, and operations of the respective units in the printing apparatus 10 are controlled by control devices. A control system will be described in detail later.

<Sheet Storage Unit>

Figure 2:
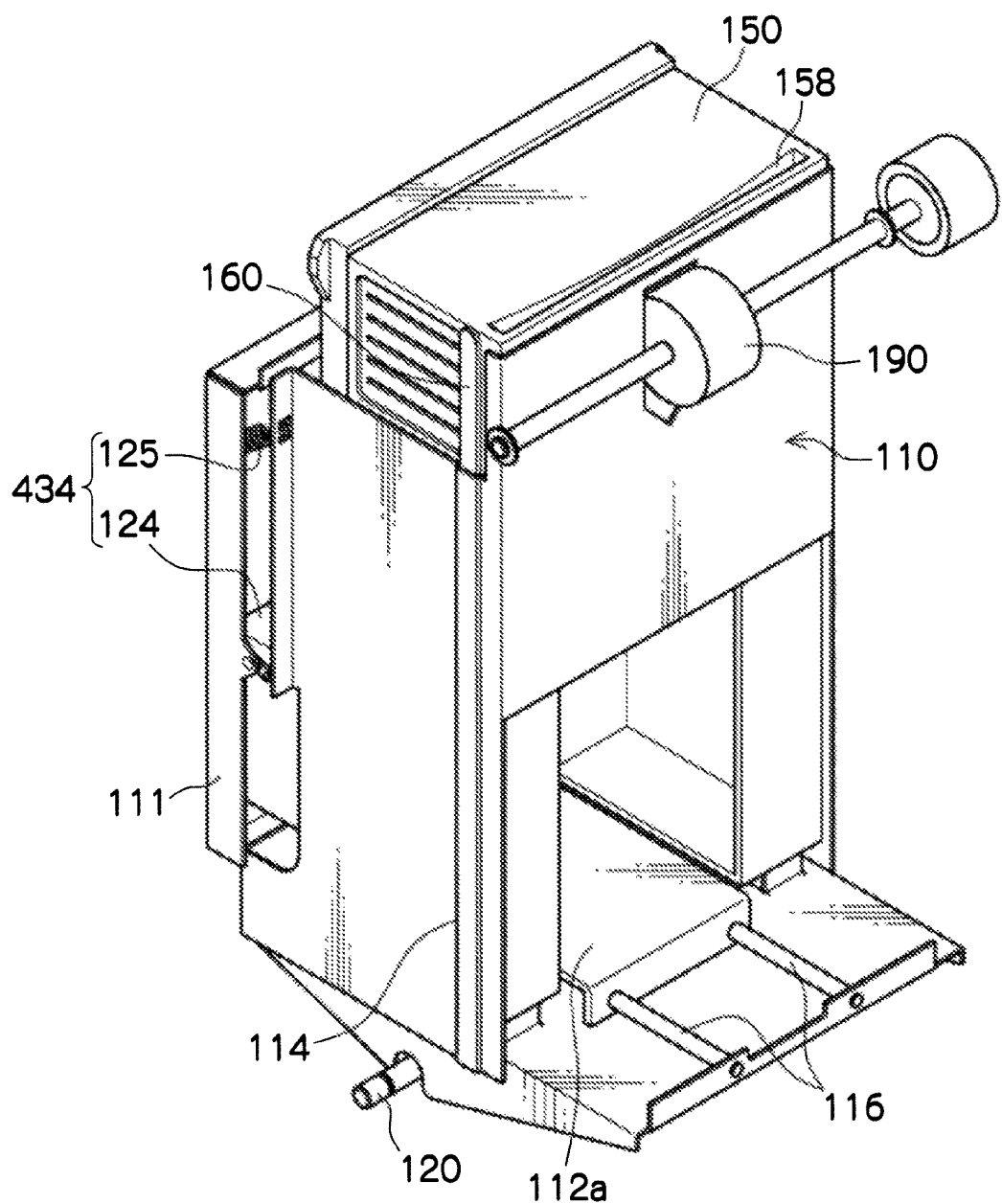
FIG. 2 is a front perspective view of a sheet storage unit.
Figure 3:
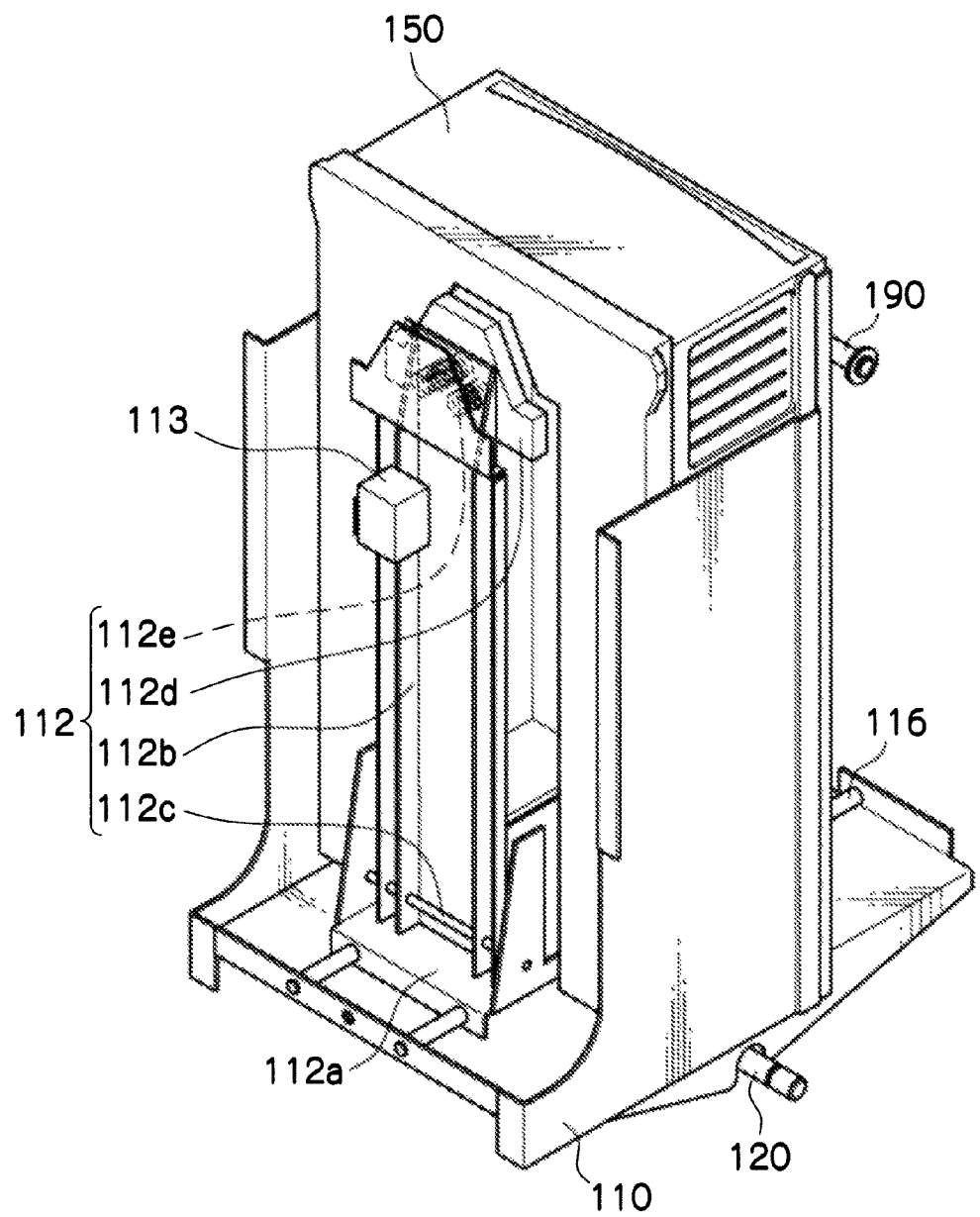
FIG. 3 is a rear perspective view of the sheet storage unit.
Figure 4:
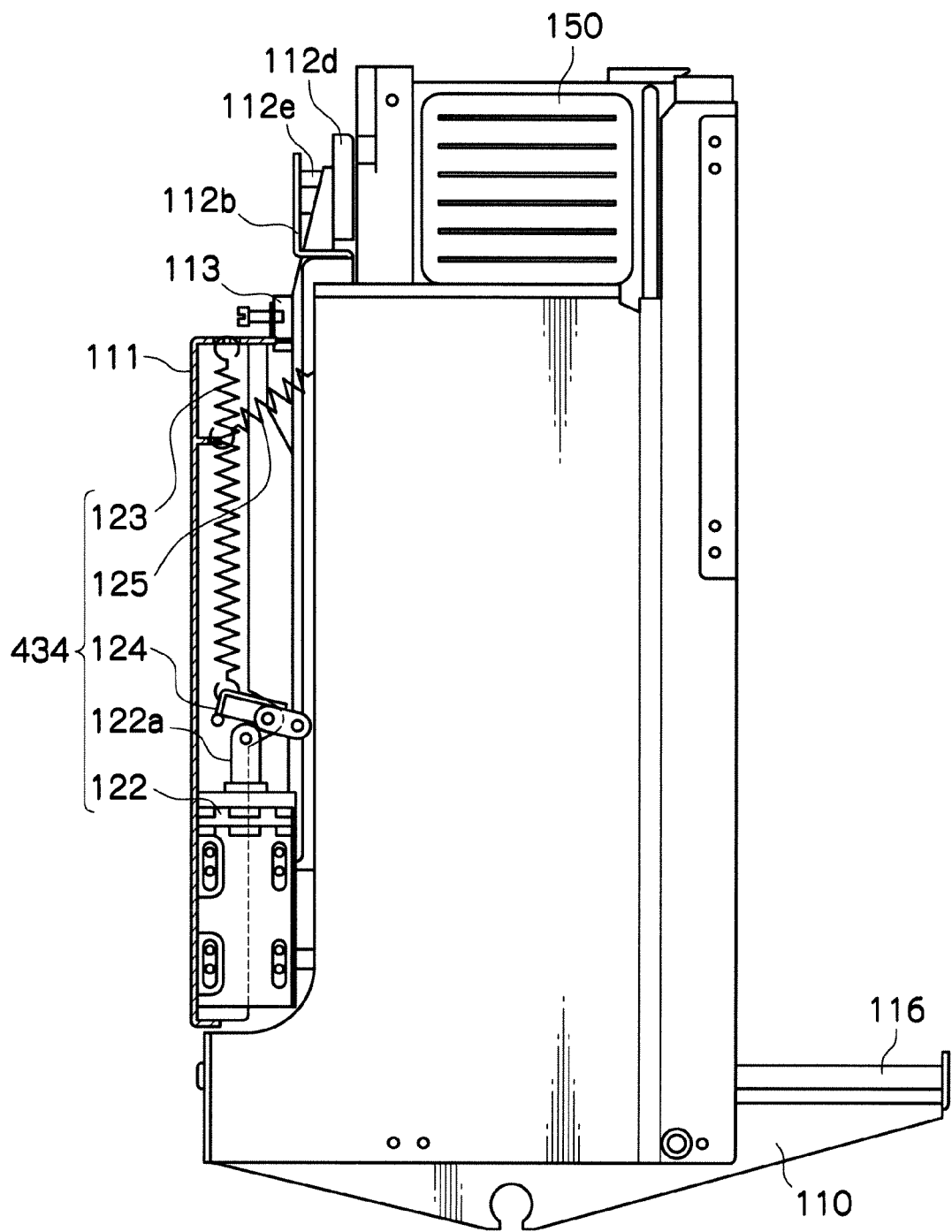
FIG. 4 is a side view of the sheet storage unit.

FIGS. 2 and 3 are perspective views illustrating a detailed configuration of the above described sheet storage unit 100. FIG. 4 is a side view illustrating the detailed configuration of the sheet storage unit 100.

This sheet storage unit 100 includes a sheet storage main body 110, a fixed plate 111, a pressure plate 112 and a sheet feeding cassette 150. The sheet feeding cassette 150 can be mounted so as to be attachable and detachable to and from the sheet storage main body 110. The fixed plate 111 is fixed to a frame 11 of the printing apparatus 10, and the sheet storage main body 110 is disposed turnably with respect to the fixed plate 111.

Figure 18:
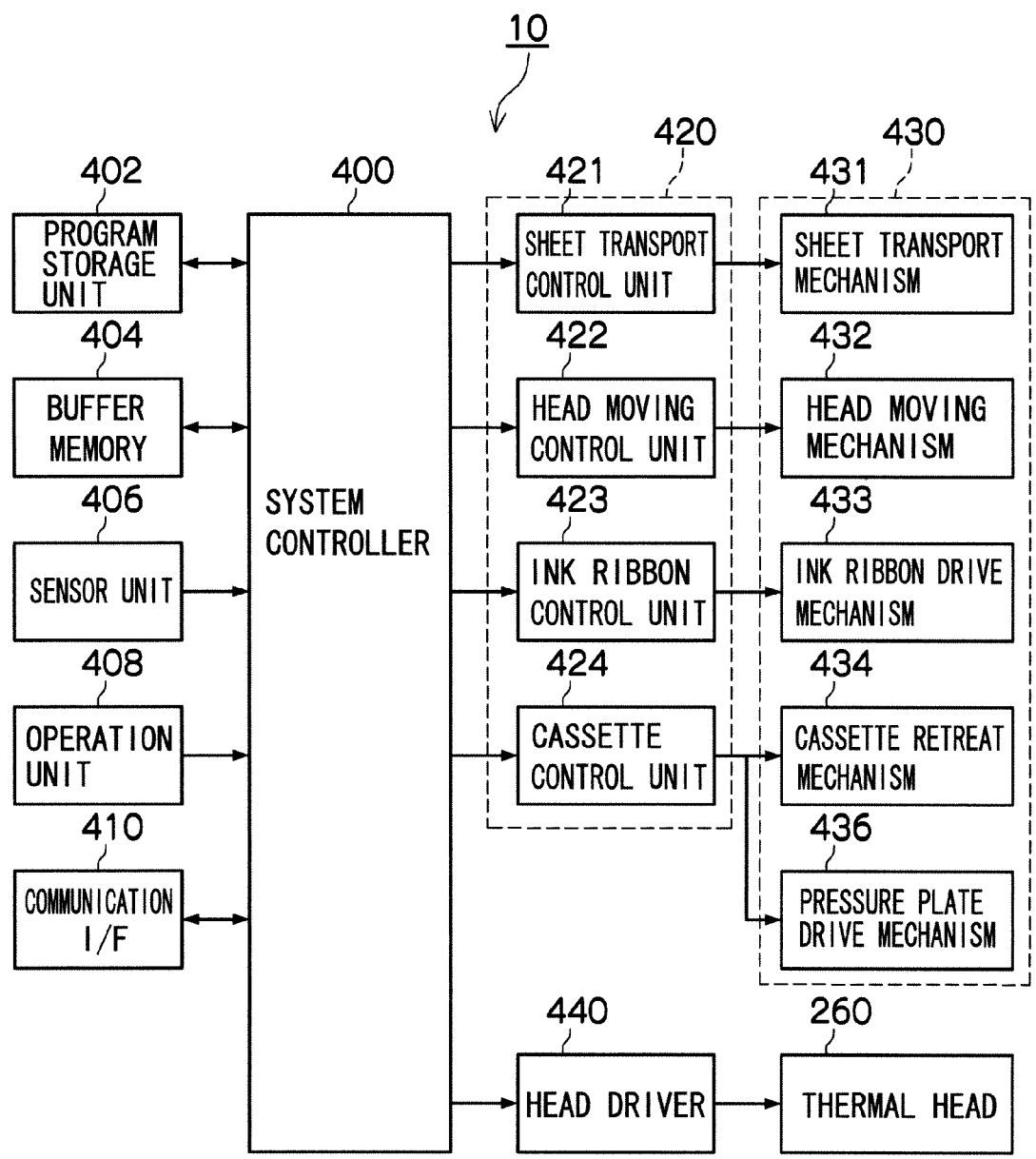
FIG. 18 is a block diagram illustrating a configuration of a main portion of the printing apparatus.

As illustrated in FIGS. 2 to 4, the sheet storage main body 110 is disposed in a manner rockable around a rotation shaft 120 of a bottom portion, and is adapted to be able to be rocked by a cassette retreat mechanism 434 (see FIG. 18). The cassette retreat mechanism 434 includes a solenoid 122, a spring 123, a link mechanism 124, an urging spring 125 and a stopper 126 (see FIG. 8), as illustrated in FIG. 4.

The solenoid 122 is, for example, a pull-type solenoid, and is adapted so that a piston 122a can be moved up and down (moved in upper/lower directions in FIG. 4). The urging spring 125 is, for example, a coil spring whose both ends are disposed on sides of the fixed plate 111 and the sheet storage main body 110 so that the sheet storage main body 110 is urged by force in a direction of counterclockwise rotation around the rotation shaft 120.

Figure 5:
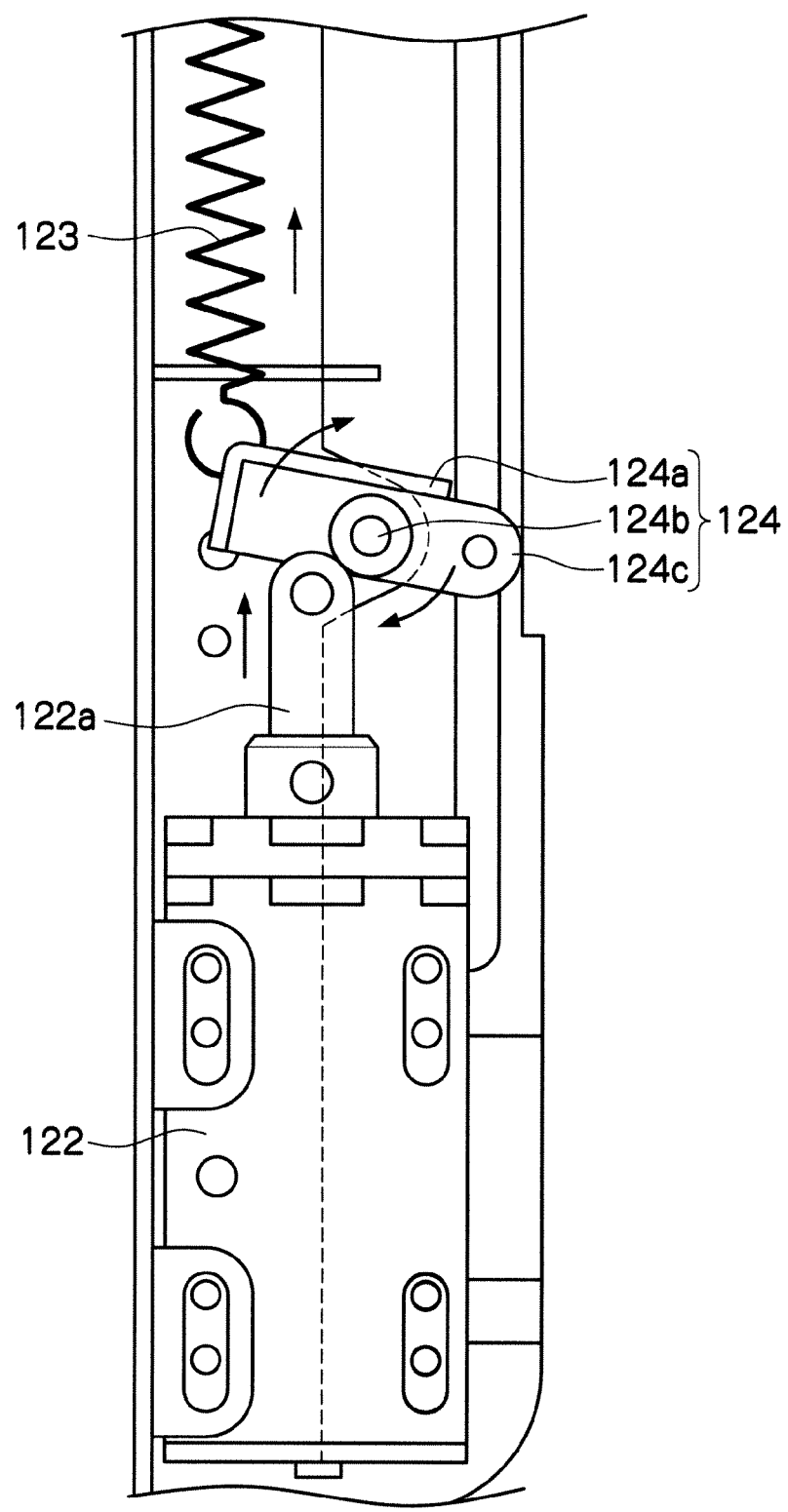
FIG. 5 is a partially enlarged side view of the sheet storage unit.

The link mechanism 124 includes a lever 124a, a turning shaft 124b and an arm 124c, as illustrated in FIG. 5. The lever 124a and the atm 124c are disposed in a manner turnable around the turning shaft 124b. The spring 123 and the piston 122a are coupled to the lever 124a. The lever 124a is turned clockwise around the turning shaft 124b by urging force of the spring 123, and the lever 124a is turned counterclockwise around the turning shaft 124b when the piston 122a is drawn in the lower direction.

Usually, energization to the solenoid 122 is turned on, and the piston 122a is drawn in the lower direction. If the piston 122a is drawn in the lower direction, the arm 124c presses the sheet storage main body 110 through the pressure plate 112. Thereby, the sheet storage main body 110 is urged by force in a direction of clockwise rotation around the rotation shaft 120. The stopper 126 (see FIG. 8) is disposed at a position where the stopper 126 contacts with the sheet storage main body 110 when the sheet storage main body 110 is retained at a vertical position. Clockwise turning of the sheet storage main body 110 is stopped when the sheet storage main body 110 contacts with the stopper 126.

When the energization to the solenoid 122 is turned off, as illustrated in FIG. 5, the lever 124a is turned clockwise around the turning shaft 124b by the spring 123, the piston 122a is drawn up in the upper direction, and the arm 124c is turned clockwise. Thereby, force of the arm 124c pressing the sheet storage main body 110 is eliminated, and the sheet storage main body 110 is turned counterclockwise around the rotation shaft 120 by urging force of the urging spring 125. A stopper (not illustrated) is disposed at a position where the stopper contacts with the sheet storage main body 110 when the sheet storage main body 110 tilts by a predetermined angle (for example, 30°). The counterclockwise turning of the sheet storage main body 110 is stopped when the sheet storage main body 110 contacts with this stopper.

It should be noted that a specific configuration of the cassette retreat mechanism 434 is not limited to the illustrated configuration. Any mechanism may be used in which the sheet storage main body 110 can be turned clockwise or counterclockwise around the rotation shaft 120. Moreover, as the solenoid 122, a push-type solenoid or a push/pull-type solenoid may be used instead of the pull-type solenoid. Moreover, the sheet storage main body 110 may be urged by force in a direction of the clockwise turning around the rotation shaft 120, by the urging spring, and the sheet storage main body 110 may be turned counterclockwise around the rotation shaft 120 by the link mechanism.

Figure 6:
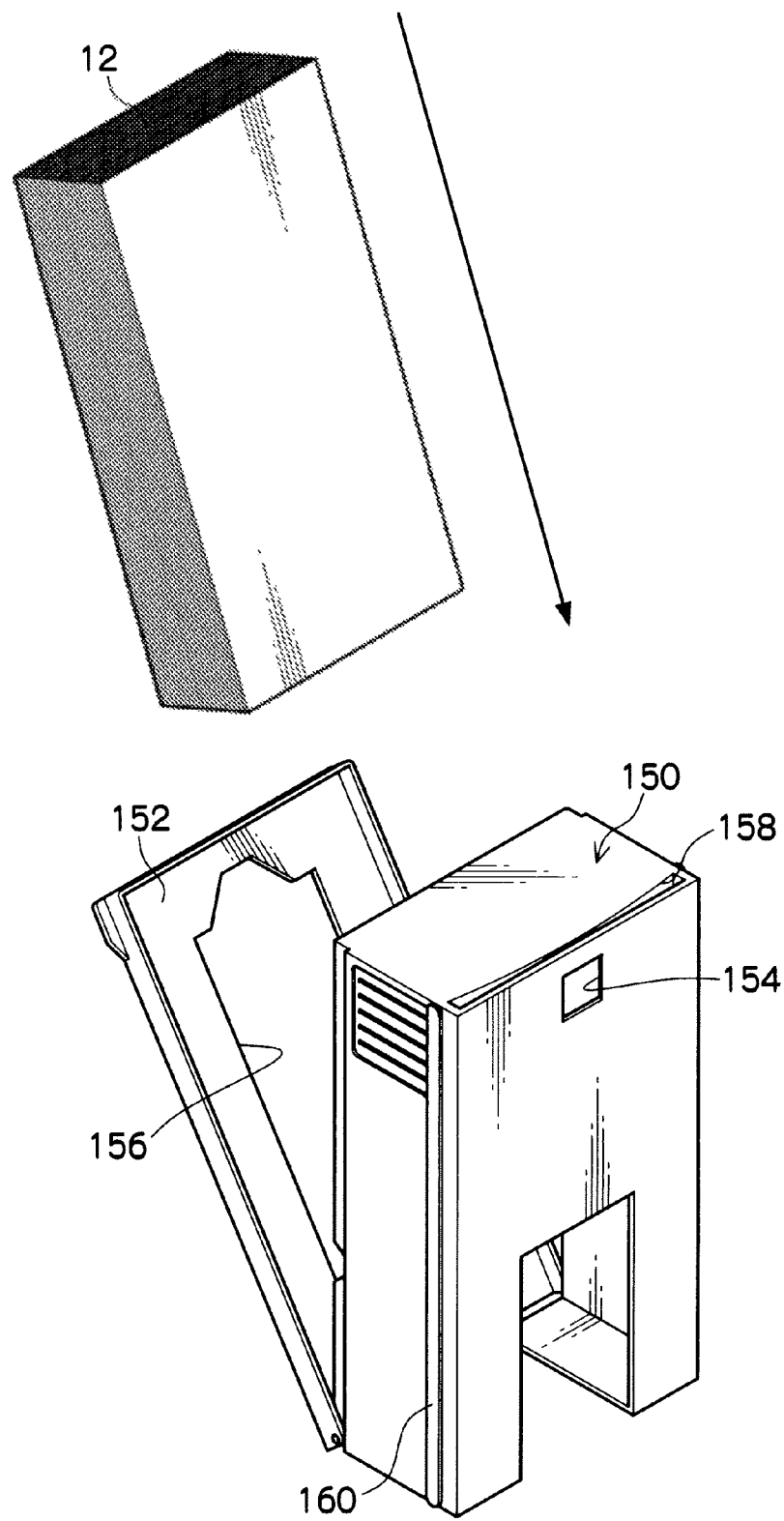
FIG. 6 is a perspective view of a sheet feeding cassette in which lenticular sheets are inserted.
Figure 7:
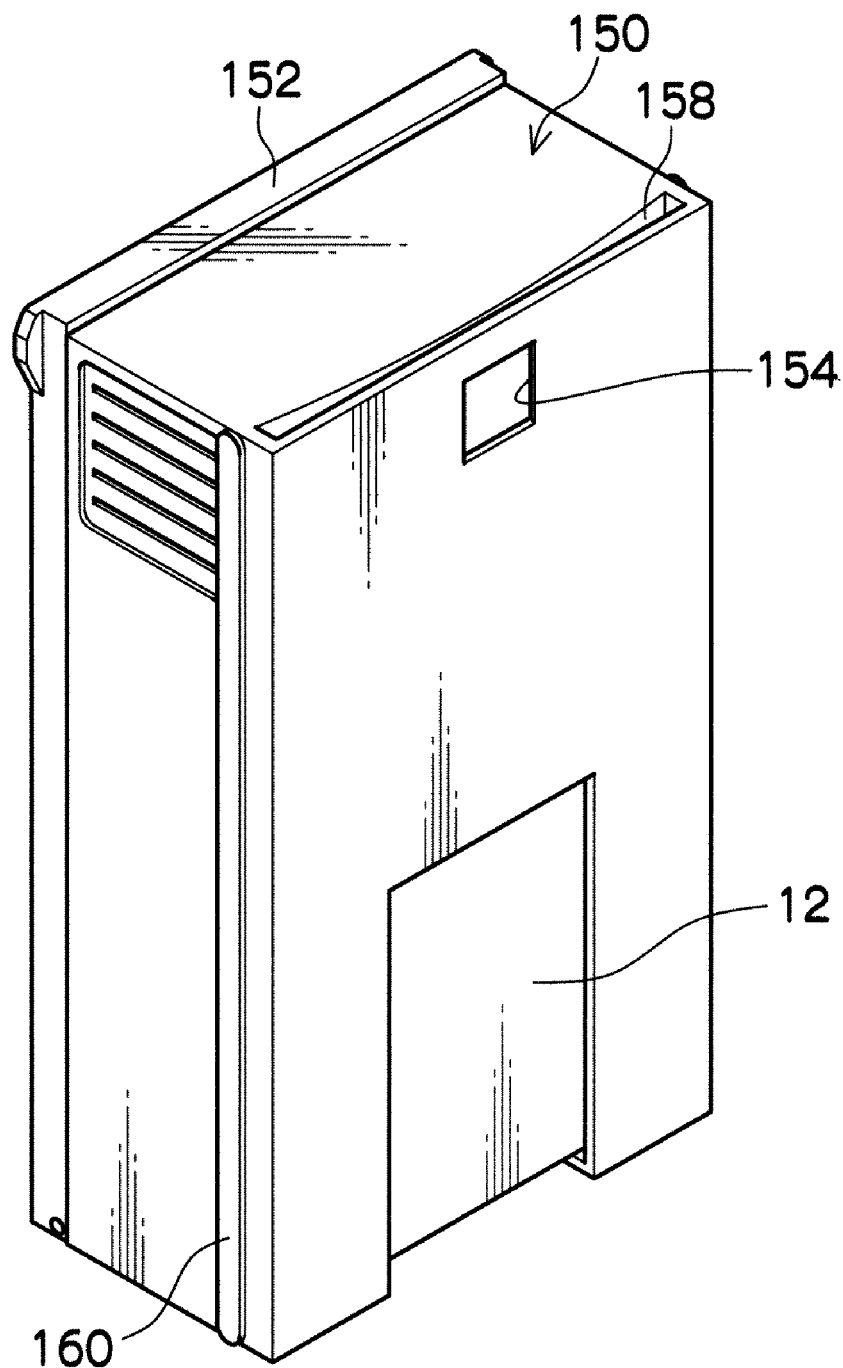
FIG. 7 is a perspective view of the sheet feeding cassette whose cassette cover is closed.

FIGS. 6 and 7 are perspective views of the sheet feeding cassette 150, respectively. FIG. 6 illustrates a situation where a cassette cover 152 of the sheet feeding cassette 150 is opened, and about 100 to 200 stacked lenticular sheets 12 are inserted into the sheet feeding cassette 150. FIG. 7 illustrates a state where the cassette cover 152 is closed after the lenticular sheets 12 are inserted into the sheet feeding cassette 150.

On the front of this sheet feeding cassette 150, an opening 154 is formed in which a feed roller 190 (see FIG. 2) is inserted. On the other hand, on the cassette cover 152 on the rear of this sheet feeding cassette 150, a pressure plate opening 156 is formed in which the L-shaped pressure plate 112 (see FIG. 3) is inserted.

Moreover, on the top of the sheet feeding cassette 150, there is formed an outlet 158 through which one of the lenticular sheets 12 is outputted from the cassette. The outlet 158 is formed to have a width which is narrowest at a central portion and becomes wider toward both ends. A generally central portion of the outlet 158 is formed to have a width W which is wider than a sheet thickness t of one lenticular sheet 12, and narrower than a sheet thickness 2t of two lenticular sheets 12. The outlet 158 is formed to have the width which is narrowest at the central portion and becomes wider toward the both ends, in consideration that a generally central portion of the lenticular sheet 12 is pressed by the pressure plate 112 (to be described in detail later) and thus the both ends bend accordingly.

On the side of the sheet feeding cassette 150, a ridge 160 is formed in the vertical direction. The ridge 160 of the sheet feeding cassette 150 engages with a groove 114 formed on the side of the sheet storage main body 110, and thereby, the sheet feeding cassette 150 is positioned at a predetermined position in the sheet storage main body 110.

Figure 8:
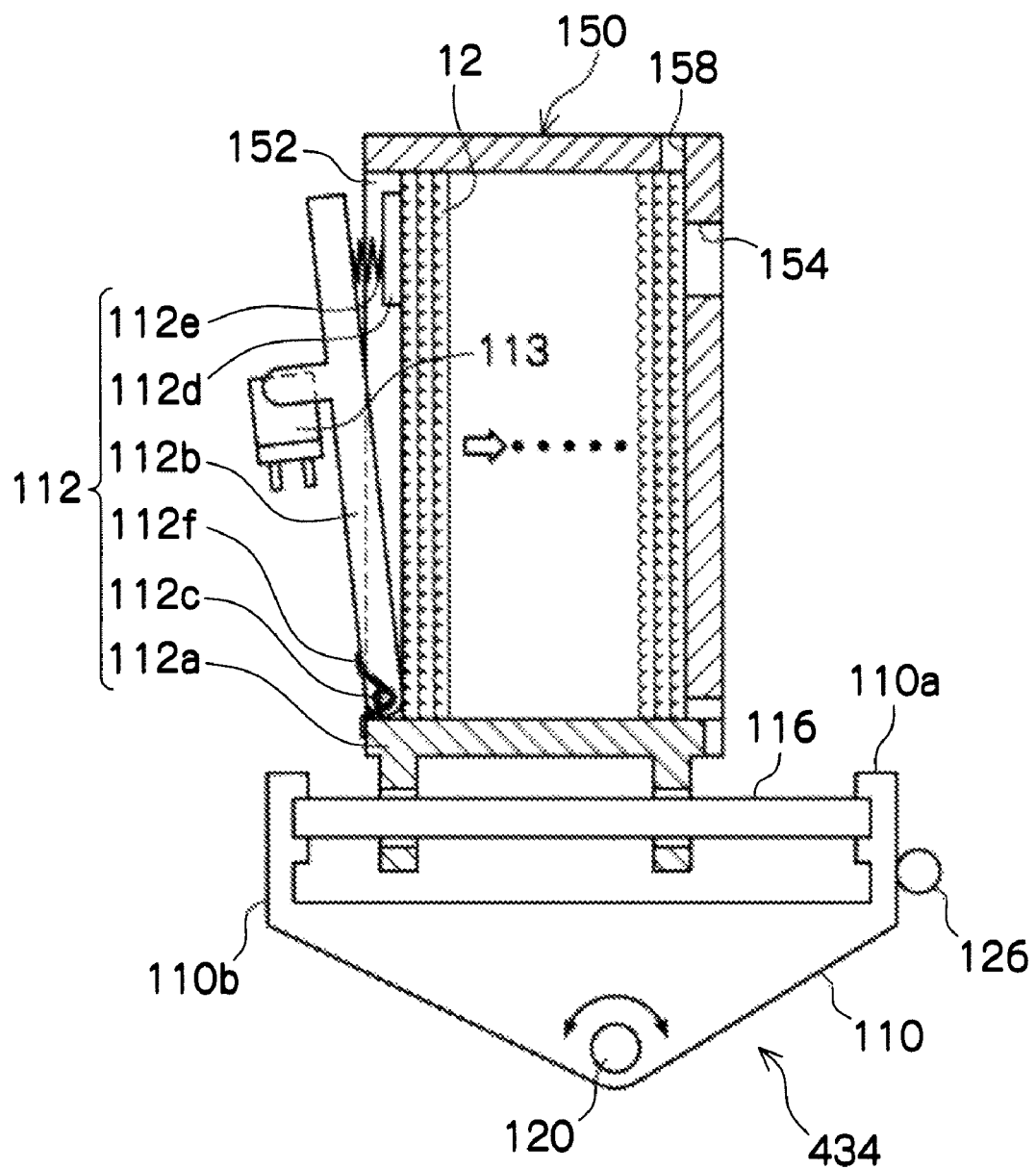
FIG. 8 is a schematic side view of the sheet storage unit.

As illustrated in FIG. 8, when the sheet feeding cassette 150 is inserted into the sheet storage main body 110, the lenticular sheets 12 stored in the sheet feeding cassette 150 are placed on the generally L-shaped pressure plate 112 of the sheet storage main body 110.

As illustrated in FIGS. 3 and 8, the pressure plate 112 includes a bottom portion 112a, a rear portion 112b, a rocking shaft 112c, a pushing plate 112d, an elastic member 112e and an elastic member 112f, and is supported with one degree of freedom in directions of the front and the rear (in left and right directions on FIG. 8) by two guide shafts 116.

Two ribs are formed on the bottom portion 112a. Holes in which the two guide shafts 116 are inserted are formed in the two ribs. The bottom portion 112a is slid along the two guide shafts 116, and thereby, the lenticular sheets 12 are slid. The rocking shaft 112c is disposed on the bottom portion 112a.

The rear portion 112b is rockably disposed on the bottom portion 112a through the rocking shaft 112c. Rocking of the rear portion 112b is detected by a rocking sensor 113 disposed on the fixed plate 111. The rocking sensor 113 outputs a Lo signal when the rocking of the rear portion 112b is not detected, and outputs a Hi signal when the rocking of the rear portion 112b is detected.

On the front side near the upper end of the rear portion 112b, the pushing plate 112d is disposed through the elastic member 112e. When the pushing plate 112d is caused to contact with the lenticular sheets 12, the lenticular sheets 12 are urged by urging force in the front direction (the right direction on FIG. 8) by the elastic member 112e and the elastic member 112f. Moreover, the rear portion 112b is urged by the urging force in the front direction by the elastic member 112f (see FIG. 8).

Figure 9:
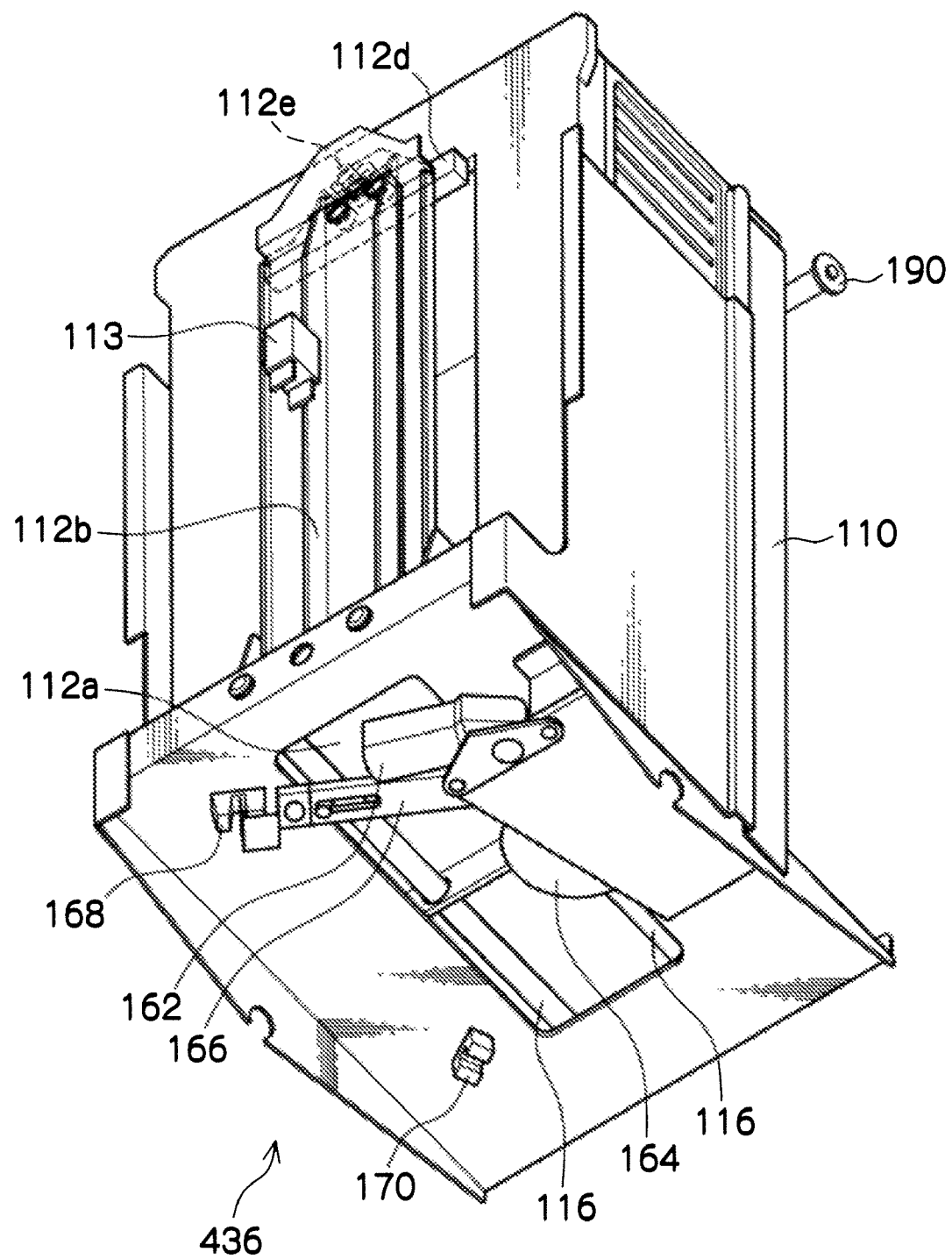
FIG. 9 is a bottom view of the sheet storage unit.

As illustrated in FIG. 9, the pressure plate 112 can be slid in the front direction or the rear direction (moved parallel) by a pressure plate drive mechanism 436, in a state where the lenticular sheets 12 are placed on the pressure plate 112. The pressure plate drive mechanism 436 is disposed on the bottom of the sheet storage main body 110, and includes a motor 162, a gearbox 164, an arm 166, and detection switches 168 and 170.

The gearbox 164 includes, for example, a mechanism which transmits motion between non-parallel axes of a worm formed integrally with an output shaft of the motor 162, and a worm wheel meshing with the worm, or the like, and transmits an output of the motor 162 to the arm 166. The motor 162 is forward/reverse rotatable. For example, with forward rotation of the motor 162, the arm 166 causes the sheet storage main body 110 to turn counterclockwise as viewed from the bottom. With reverse rotation of the motor 162, the arm 166 causes the sheet storage main body 110 to turn clockwise as viewed from the bottom.

Each of the detection switches 168 and 170 is, for example, a transmissive photointerrupter in which a light emitting element and a light receiving element face each other at a certain interval, and which detects passing of an object between the light emitting element and the light receiving element. When a leading end of the arm 166 passes through a detection gap between the light emitting element and the light receiving element of each of the detection switches 168 and 170, each of the detection switches 168 and 170 is turned ON, and the rotation of the motor 162 is stopped.

An elongate hole is formed in the arm 166, and a pin (not illustrated) formed downward on the bottom of the pressure plate 112 is inserted into the elongate hole. The pin slides in the elongate hole along with the turning of the arm 166, and thereby, the pressure plate 112 is moved parallel. In the present embodiment, when the arm 166 causes the sheet storage main body 110 to turn counterclockwise as viewed from the bottom, the pressure plate 112 is moved in the front direction. When the arm 166 causes the sheet storage main body 110 to turn clockwise as viewed from the bottom, the pressure plate 112 is moved in the rear direction.

Figure 10:
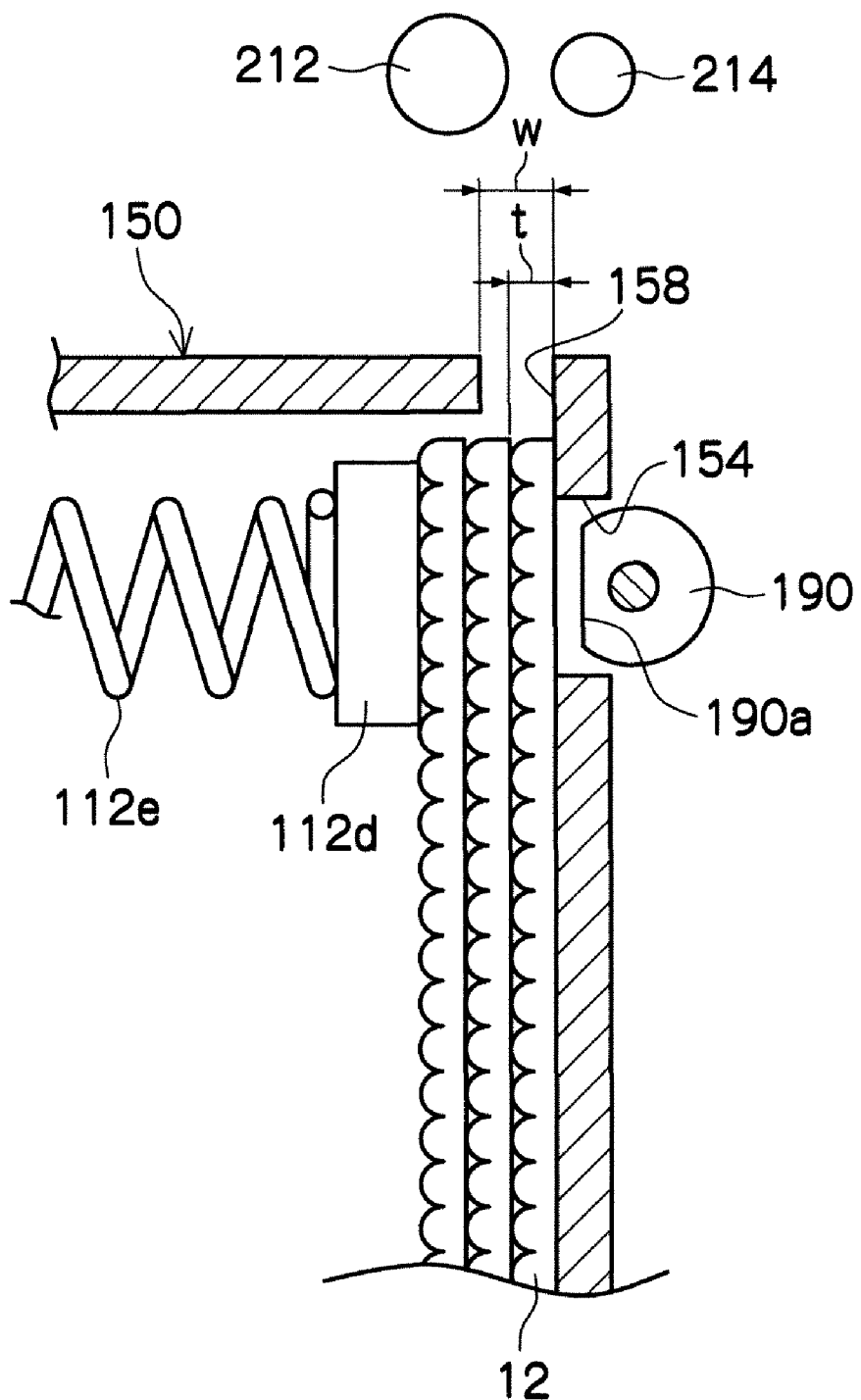
FIG. 10 is an enlarged view of a main portion of the sheet storage unit.

A detection device (not illustrated) is disposed in the sheet storage main body 110. When the sheet feeding cassette 150 is inserted into the sheet storage main body 110, the pressure plate 112 is moved in the front direction by the pressure plate drive mechanism 436, and the pushing plate 112d presses the lenticular sheets 12 in the sheet feeding cassette 150, as illustrated in FIG. 10. When a pressure sensor (not illustrated) detects that the lenticular sheets 12 are pressed with a certain pressure, the moving of the pressure plate 112 in the front direction is stopped.

The feed roller 190 (see FIG. 1) outputs the lenticular sheet 12 pressed with the certain pressure by the pressure plate 112, from the sheet feeding cassette 150. When the lenticular sheet 12 is outputted from the sheet feeding cassette 150, force of the pushing plate 112d pressing the lenticular sheets 12 is reduced, and the rear portion 112b rocks. When the rocking of the rear portion 112b is detected and the Hi signal is outputted by the rocking sensor 113 (see FIG. 9), the pressure plate 112 is moved in the front direction by the pressure plate drive mechanism 436 until it is detected that the lenticular sheets 12 are pressed with a predetermined pressure. Thereby, a position of the pressure plate 112 is controlled so that the pressure plate 112 constantly presses the lenticular sheets 12 with the certain pressure.

The feed roller 190 is a cross-sectionally D-shaped (D-cut) and rod-shaped member, as illustrated in FIG. 10. The feed roller 190 is formed with a material, for example, rubber or the like, so that a friction coefficient $\mu_2$ between the feed roller 190 and the lenticular sheet 12 is larger than a friction coefficient $\mu_1$ between the lenticular sheets 12.

If the detection device (not illustrated) detects that the sheet feeding cassette 150 is not inserted into the sheet storage main body 110, a position of the feed roller 190 in a rotation direction is controlled so that a straight portion 190a faces the pushing plate 112d. In this case, since the feed roller 190 and the lenticular sheet 12 do not contact with each other, the insertion of the sheet feeding cassette 150 into the sheet storage main body 110 is not prevented. When the sheet feeding cassette 150 is inserted into the sheet storage main body 110, the lenticular sheets 12 are pressed by the pushing plate 112d as illustrated in FIG. 10, to be set in a waiting state where the feed roller 190 can rotate.

Figure 11:
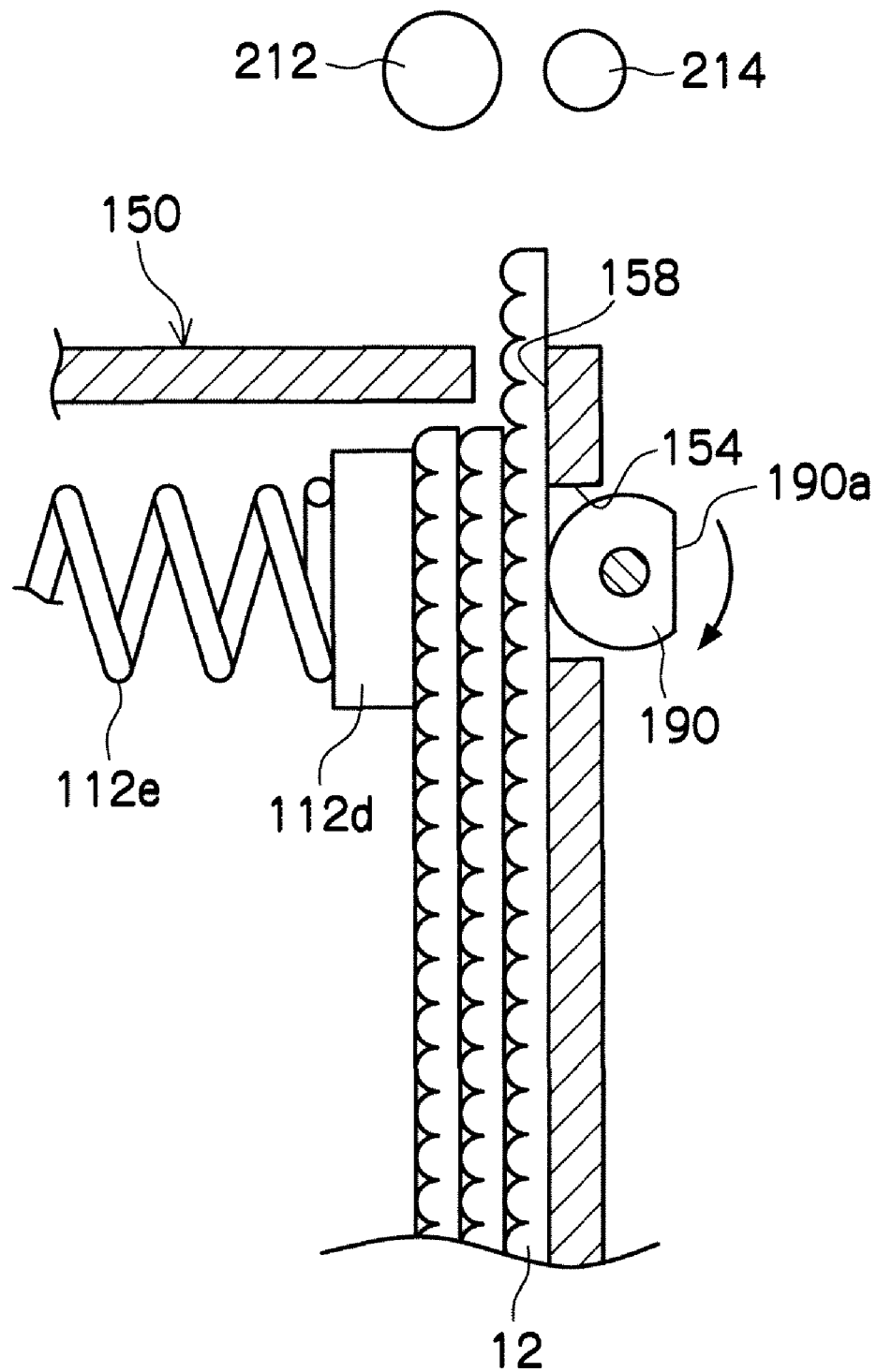
FIG. 11 is an enlarged view of the main portion of the sheet storage unit.

When the feed roller 190 is driven to rotate in a feed direction in a state where the lenticular sheets 12 are pressed, the lenticular sheet 12 contacting with the feed roller 190 is moved in response to the rotation of the feed roller 190, and the lenticular sheet 12 is fed through the outlet 158 of the sheet feeding cassette 150, as illustrated in FIG. 11. The outlet 158 is formed to have the width W which is wider than the sheet thickness t and narrower than the sheet thickness 2t of two sheets. Thereby, only one lenticular sheet 12 is fed through the outlet 158.

Figure 12:
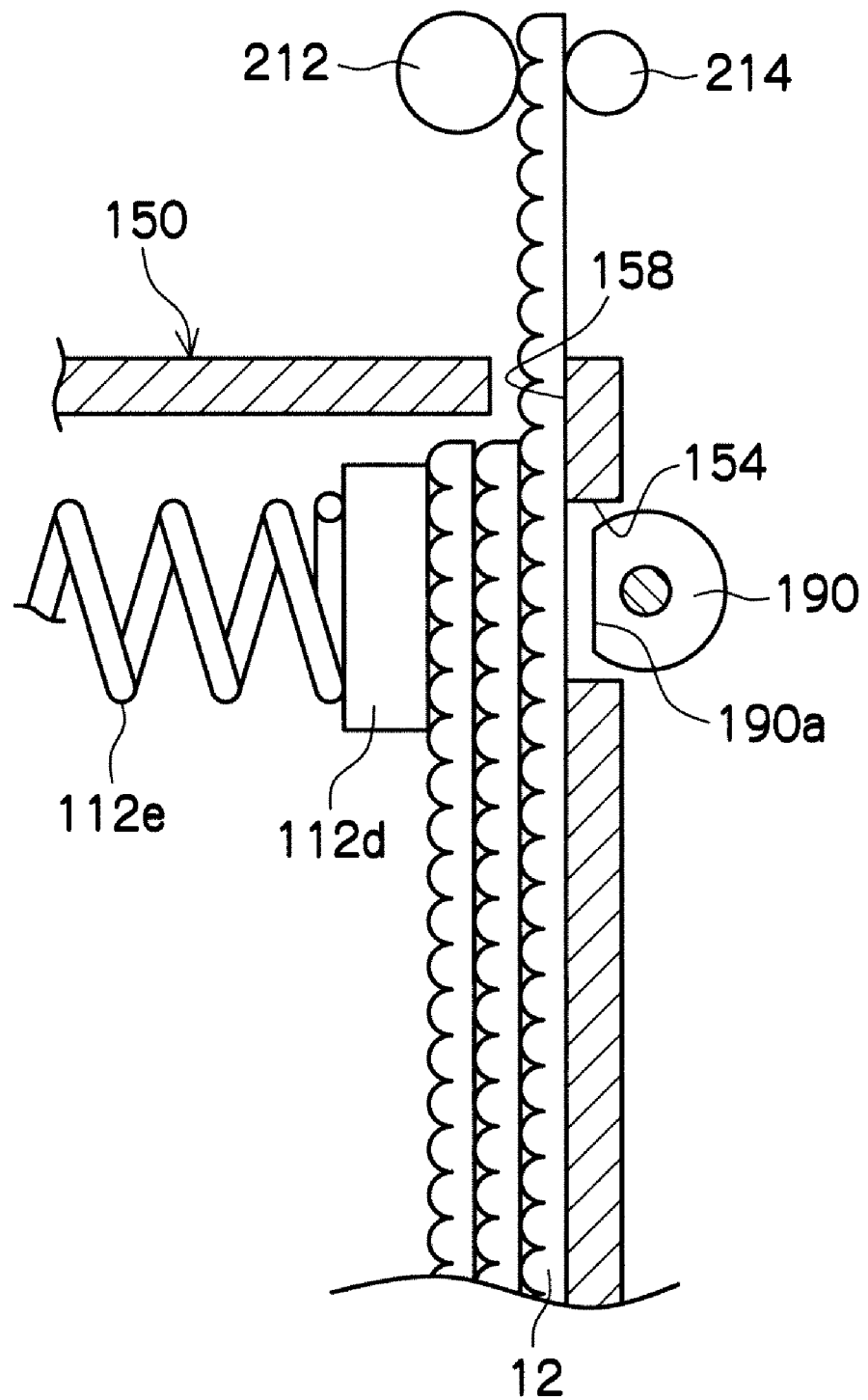
FIG. 12 is an enlarged view of the main portion of the sheet storage unit.

When the feed roller 190 further rotates and reaches a position where the straight portion 190a faces the lenticular sheet 12 as illustrated in FIG. 12, the rotation is controlled to be stopped. Thereby, the lenticular sheet 12 is fed from the sheet feeding cassette 150 by a certain amount (for example, to a position where a downstream-side end portion of the lenticular sheet 12 can be clamped between a transport roller 212 and a capstan 214). Moreover, at this time, the feed roller 190 does not contact with the lenticular sheet 12 (frictional force from the feed roller 190 does not act on the lenticular sheet 12).

<Photographic Printing Unit>

As illustrated in FIGS. 1 and 2, the photographic printing unit 200 includes a sheet transport mechanism 431 (see FIG. 18) which transports the lenticular sheet 12 in the photographic printing or the like, a ribbon switching gatling mechanism 250 in which the R, Y, M, C and W ink ribbons are loaded, and the thermal head 260.

The sheet transport mechanism 431 mainly includes the feed roller 190, the transport roller 212, the capstan 214, a clamper 220 (see FIG. 1 for the above members), and a clamper transport unit 230 (see FIGS. 13 and 14) which moves the clamper 220.

A leading end portion of the lenticular sheet 12 fed from the sheet feeding cassette 150 by the certain amount by the feed roller 190 reaches a position of the transport roller 212, as illustrated in FIG. 12. Here, the capstan 214 is pressure-bonded to the transport roller 212 through the lenticular sheet 12, and also, the transport roller 212 is driven. Thereby, the lenticular sheet 12 can be transported. When the transport roller 212 is driven and thereby the leading end portion of the lenticular sheet 12 reaches a transport roller 213, a capstan 215 is pressure-bonded to the transport roller 213 through the lenticular sheet 12, and also, the transport roller 213 is driven. Thereby, the lenticular sheet 12 can be further transported (see FIGS. 1 and 16).

This transport of the lenticular sheet 12 by the transport rollers 212 and 213 as well as the capstans 214 and 215 is performed until the leading end of the lenticular sheet 12 reaches the clamper 220 waiting at a predetermined lowest position. It should be noted that, in the clamper 220, a pair of clamp members are constantly urged in a closing direction by a spring, while in the above described waiting state, the pair of clamp members are waiting in a state where the pair of clamp members are opened against urging force of the spring, by an opening/closing mechanism 221 (see FIG. 13) including a cam and the like (see FIG. 1).

When the leading end of the lenticular sheet 12 reaches the above described clamper 220, the leading end of the lenticular sheet 12 is clamped by the clamper 220, and the capstan 214 (see FIG. 1) is caused to retreat from the transport roller 212. Subsequently, the lenticular sheet 12 is transported (moved up and down) along with the clamper 220 by the clamper transport unit 230.

Figure 13:
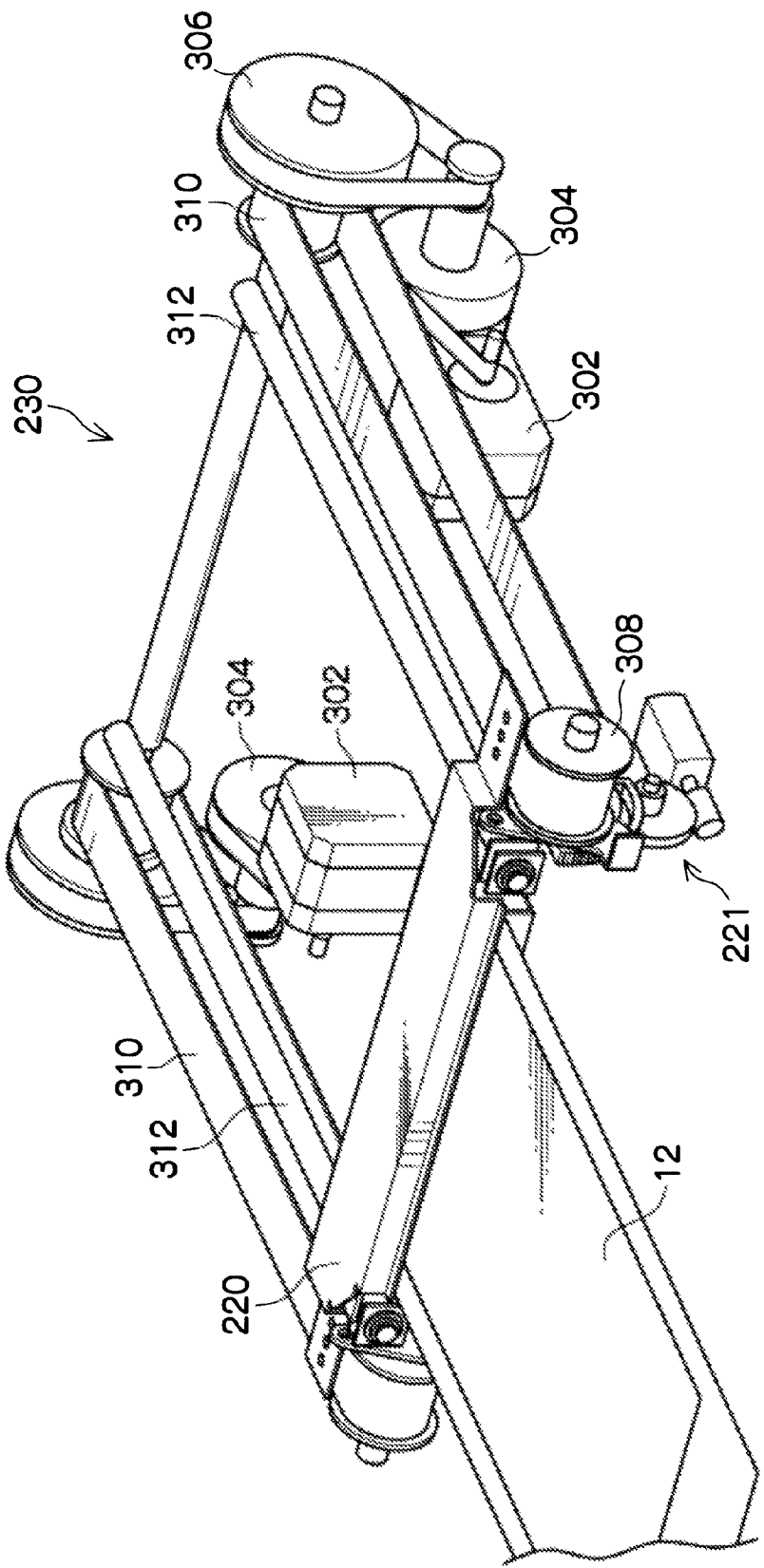
FIG. 13 is a perspective view illustrating a schematic configuration of a clamper and a clamper transport unit.
Figure 14:
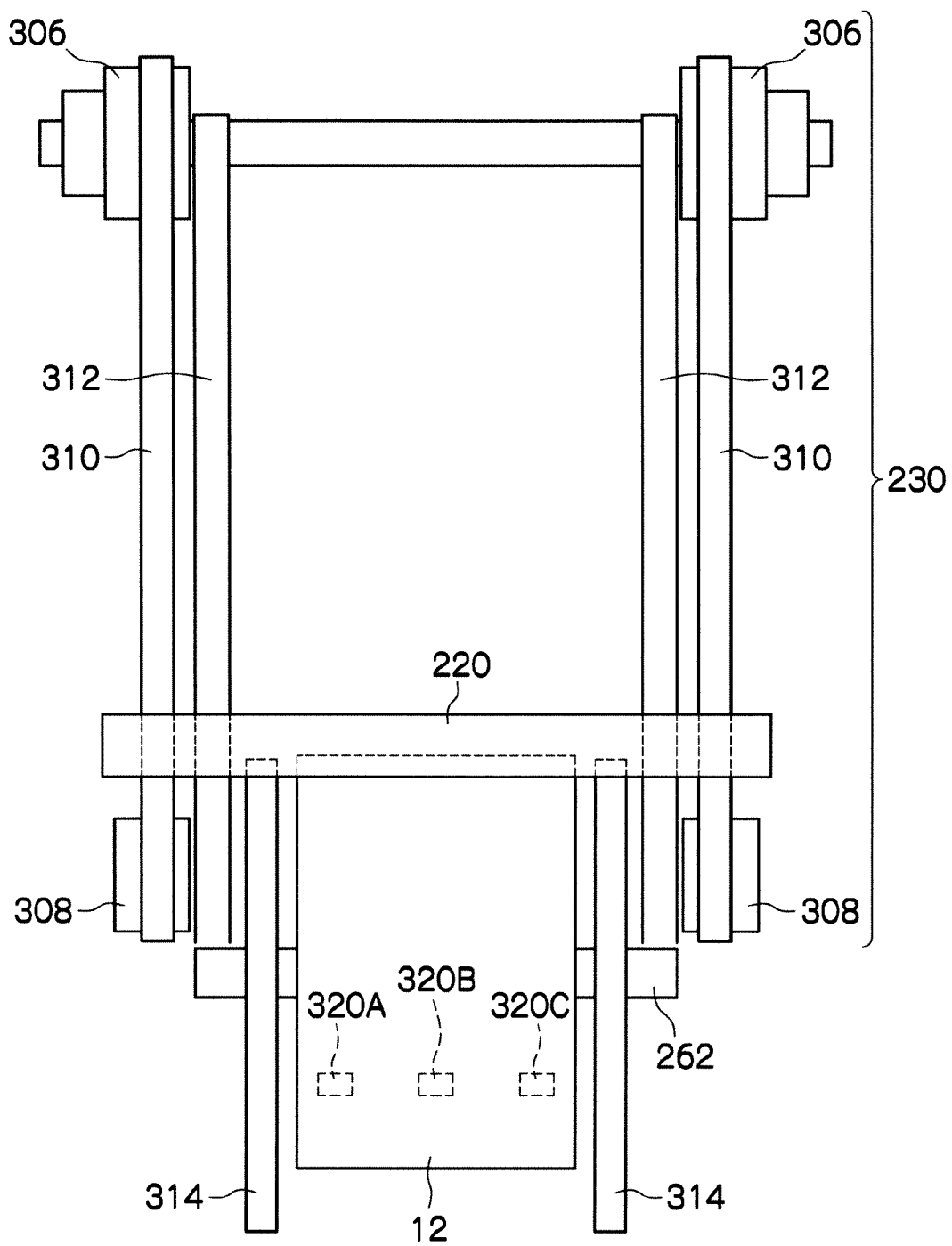
FIG. 14 is a plan view illustrating the schematic configuration of the clamper and the clamper transport unit.

FIG. 13 is a perspective view illustrating a schematic configuration of the clamper 220 and the clamper transport unit 230 as described above. FIG. 14 is a plan view illustrating the schematic configuration of the clamper 220 and the clamper transport unit 230 as described above.

A pair of drive pulleys 306, each of which is driven by a drive motor 302 through a deceleration mechanism 304, is provided at an upper end portion of the free feeding unit 300 illustrated in FIG. 1. A pair of driven pulleys 308 is provided near a platen roller 262.

Drive belts 310 are wound between the drive pulleys 306 and the driven pulley 308, and the clamper 220 is fixed between the drive belts 310 by bolts (not illustrated), as illustrated in FIGS. 13 and 14.

Moreover, guide rails 312 which guide the clamper 220 in the vertical direction along the drive belts 310 are disposed. Furthermore, resin guides 314 which guide the lenticular sheet 12 to the clamper 220 waiting at the predetermined lowest position are disposed. It should be noted that rubber guides may be disposed instead of the resin guides 314.

A width of a pair of the resin guides 314 is wider than a width of the lenticular sheet 12 by a predetermined clearance, and the resin guides 314 guide the lenticular sheet 12 along the vertical direction.

Moreover, three photosensors 320A, 320B and 320C are disposed parallel to the platen roller 262, on an entrance side of the platen roller 262, as illustrated in FIG. 14. Light-emitting diodes (LEDs) (not illustrated) are disposed at positions facing the photosensors 320A, 320B and 320C across a delivery path of the lenticular sheet 12.

A detection signal for the lenticular sheet 12 detected by the photosensors 320A, 320B and 320C has a maximum value if an optical axis of the photosensor coincides with the center of a lens of the lenticular sheet 12, and becomes minimum if the optical axis is located at a lowest position between the lenses. Therefore, a tilt (azimuth angle) of the lenticular sheet 12 can be sensed based on the detection signals from the three photosensors 320A, 320B and 320C.

Azimuth adjustment (adjustment for setting the azimuth angle to 0) for the lenticular sheet 12 is performed by clamping the leading end of the lenticular sheet 12 by the clamper 220, then driving the pair of left and right drive pulleys 306 independently from each other while monitoring the detection signals from the three photosensors 320A, 320B and 320C, and slightly tilting the clamper 220 by an amount of the azimuth adjustment.

After the azimuth adjustment is performed as described above, the clamper 220 is moved up so as to transport the lenticular sheet 12 to the photographic printing start position, and subsequently, the photographic printing by the thermal head 260 is started. When the photographic printing for one color is completed, a return operation is performed in which the drive pulleys 306 are reversed to move down the clamper 220 and the lenticular sheet 12 is returned to the photographic printing start position again.

The clamper 220 clamping the lenticular sheet 12 linearly moves up and down in the vertical direction along the guide rails 312. Moreover, in the photographic printing, since the lenticular sheet 12 moves up or down along the vertical direction, the lenticular sheet 12 is hardly bent under the sheet's own weight (significant bending occurs particularly on a photographic print medium with a low stiffness such as the lenticular sheet 12 of a thin type). Consequently, in the photographic printing, the lenticular sheet 12 is prevented from contacting with members of the printing apparatus 10, and thus, the lens surface and the photographic print surface of the lenticular sheet 12 are prevented from being scratched. Accordingly, merchandise which is fatally defective in stereoscopic vision is prevented from being made.

<Ribbon Switching Gatling Mechanism and Thermal Head>

Figure 15:
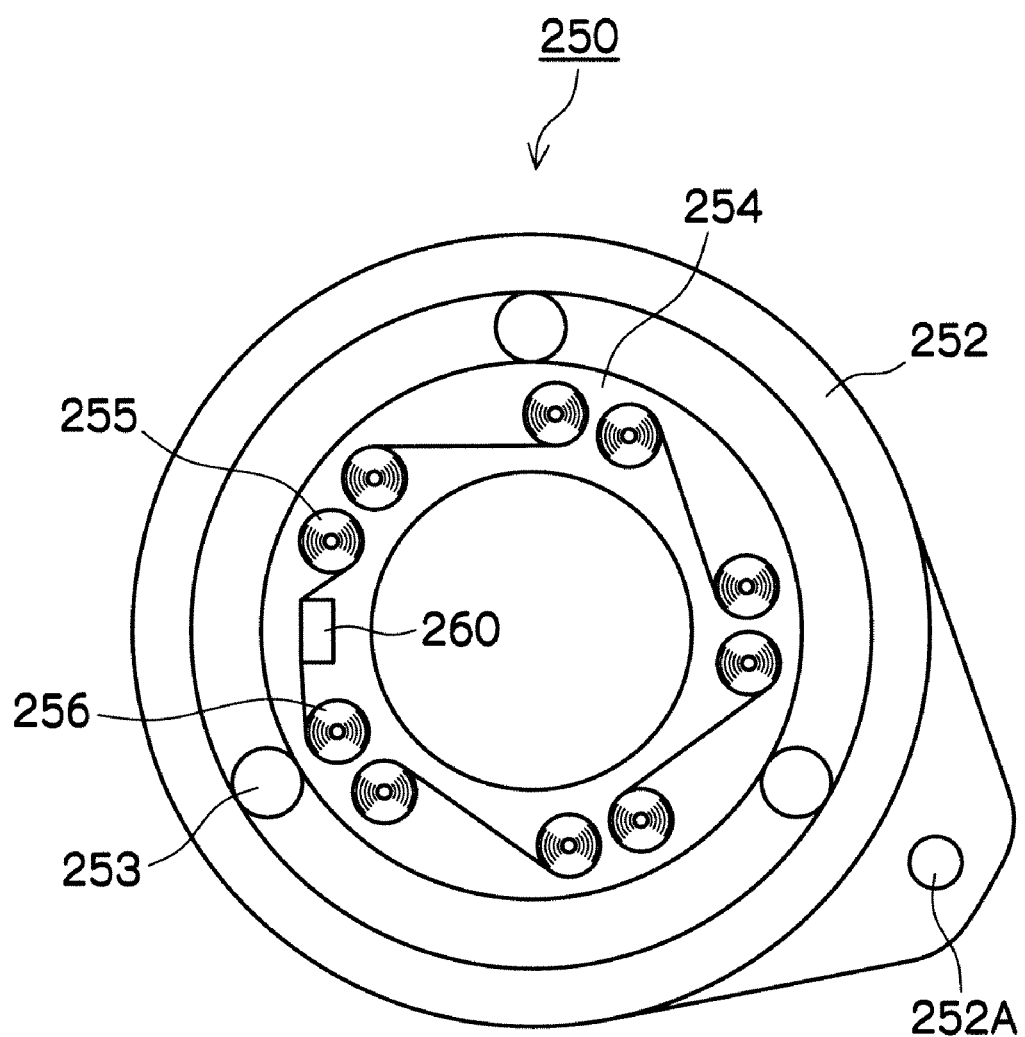
FIG. 15 is a schematic view of a ribbon switching gatling mechanism.

FIG. 15 is a schematic view of the ribbon switching gatling mechanism 250.

As illustrated in FIG. 15, the ribbon switching gatling mechanism 250 has a ribbon cage holder 252 and a ribbon cage 254 so that the ribbon cage holder 252 can rock around a ribbon cage holder rocking shaft 252A.

The thermal head 260 is provided within the ribbon cage holder 252, and is disposed at a leading end of an arm member (not illustrated) which is turnably provided on a shaft on the same axis as the ribbon cage holder rocking shaft 252A. The thermal head 260 can be moved between a photographic printing position and a retreat position by turning this arm member.

The ribbon cage holder 252 can be moved between the photographic printing position and a maintenance position by rocking (turning) the ribbon cage holder 252 around the ribbon cage holder rocking shaft 252A. A part of the ribbon cage holder 252 can be protruded from an apparatus main body at the maintenance position.

The thermal head 260 moves in an interlocked manner with the moving of the ribbon cage holder 252 to the maintenance position, and moves to a position where a heating element of the thermal head 260 can be touched from outside. Thereby, maintenance such as cleaning and replacement of the thermal head 260 can be easily performed.

On the other hand, the ribbon cage 254 is rotatably supported in the ribbon cage holder 252 by ribbon cage rotation receivers 253. Five pairs of take-up reels 255 and supply reels 256 are disposed at regular intervals in the ribbon cage 254, and the R, Y, M, C and W ink ribbons are set to the five pairs of reels, respectively. The ribbon cage 254 is rotated by the gatling mechanism so that a desired ribbon comes to a position of the thermal head 260.

The take-up reel 255 in one pair of the take-up reel 255 and the supply reel 256 which is moved to the position of the thermal head 260 takes up the ink ribbon through a friction clutch at a speed which is slightly faster than a moving speed of the lenticular sheet 12, in the photographic printing. The supply reel 256 is braked so that predetermined back tension acts on the ink ribbon. Thereby, in the photographic printing, when the lenticular sheet 12 moves, the ink ribbon is fed in an interlocked manner (in synchronization) with this moving of the lenticular sheet 12.

In the photographic printing, the thermal head 260 is moved by a head moving mechanism to the photographic printing position where the thermal head 260 contacts with the platen roller 262 through the ink ribbon and the lenticular sheet 12. Also, when the ink ribbon is switched or the lenticular sheet 12 is fed backward, the thermal head 260 is moved to the retreat position where the thermal head 260 retreats from the platen roller 262.

Moreover, the thermal head 260 is driven depending on multi-view images (six-view images in this embodiment) for a 3D image as will be described later, and sublimates ink on the ink ribbon to transfer the ink to the lenticular sheet 12.

<Sheet Transport Path>

Figure 16:
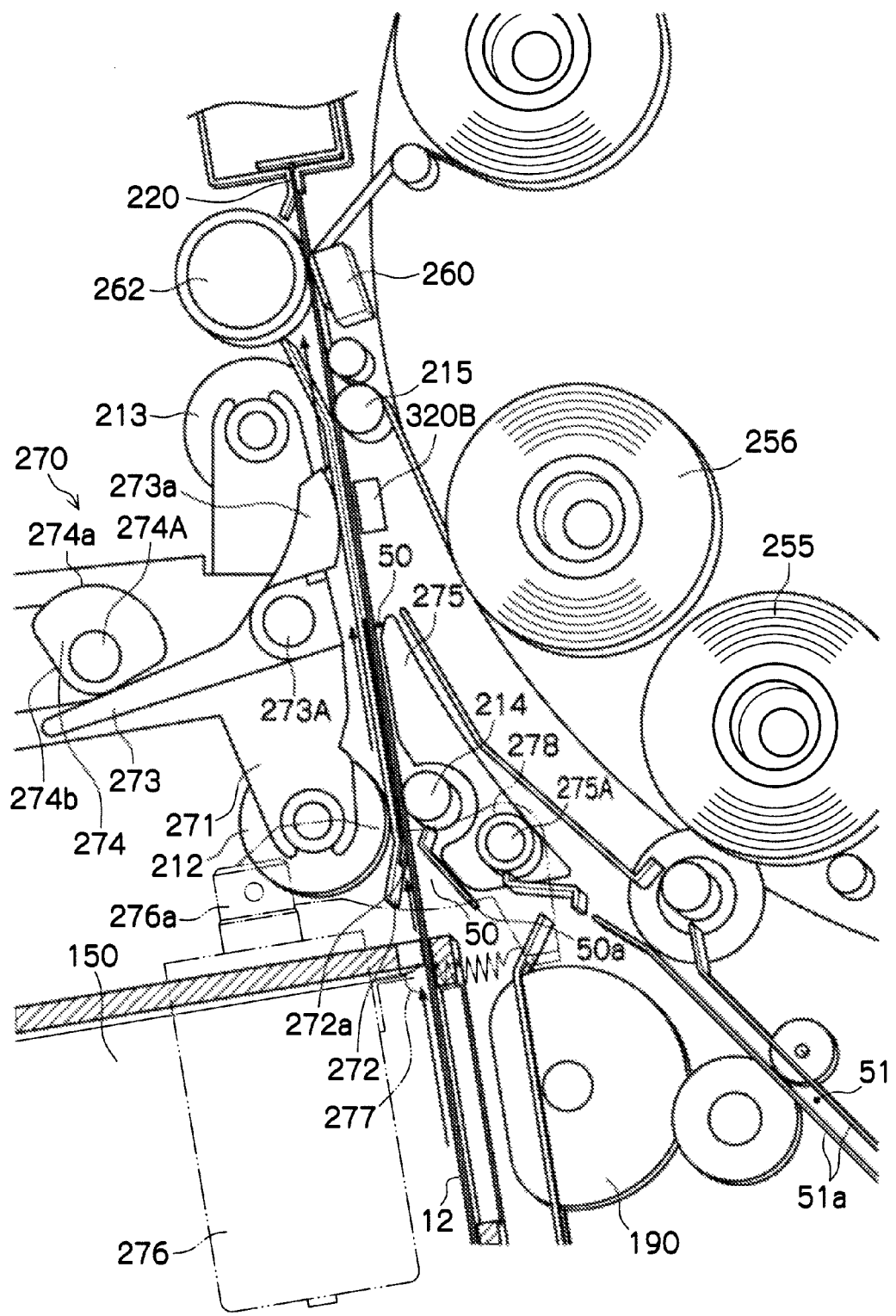
FIG. 16 is a schematic view of a sheet transport path.
Figure 17:
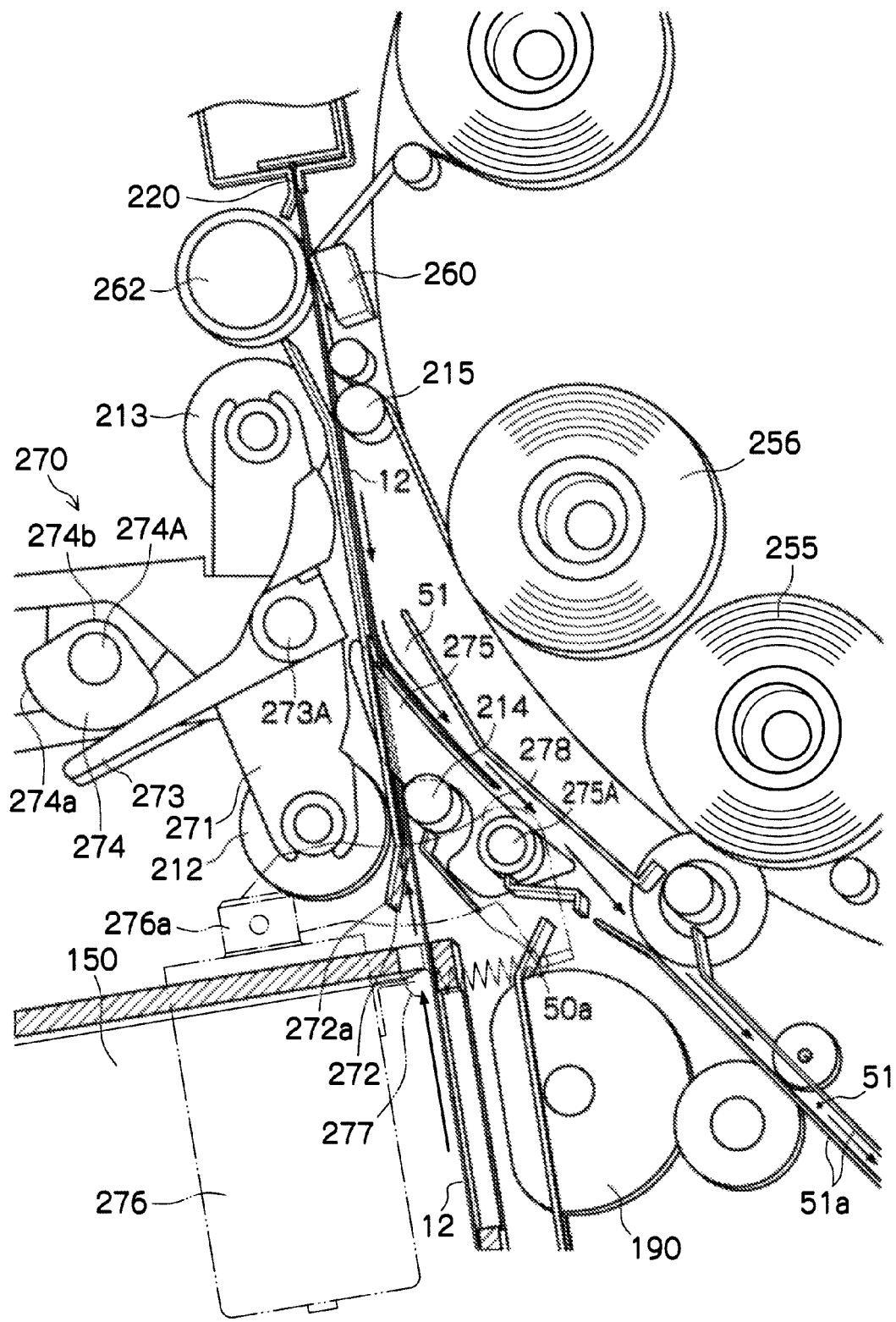
FIG. 17 is a schematic view of a sheet transport path.

FIGS. 16 and 17 are schematic views of sheet transport paths. FIG. 16 illustrates a state where the lenticular sheet 12 is transported through a transport path A 50, and FIG. 17 illustrates a state where the lenticular sheet 12 is transported through a transport path B 51. The sheet transport path includes the transport path A 50 through which the lenticular sheet 12 moves up and down in the printing, and the transport path B 51 through which the lenticular sheet 12 is transported to the outlet after the printing.

The transport path A 50 and the transport path B 51 include a mounting plate 271, a protective member 272, a lever 273, a cam 274 and a transport path switching member 275.

The protective member 272 is a plate-like member whose both ends are warped, and is fixed to the frame 11. An elongate hole 272a which enables the transport rollers 212 and 213 to contact with the lenticular sheet 12 is formed in the protective member 272. Since the protective member 272 is formed with a soft material such as rubber or resin, the photographic print surface and the lens surface of the lenticular sheet 12 are prevented from being scratched when the lenticular sheet 12 is transported.

The transport rollers 212 and 213 are rotatably disposed at a leading end of the mounting plate 271 so that the transport rollers 212 and 213 are generally aligned with the platen roller 262, and leading ends of the transport rollers 212 and 213 protrude through the elongate hole 272a to be in pressure contact with the capstans 214 and 215. Thus, when the transport roller 212 rotates, the lenticular sheet 12 is transported from the sheet feeding cassette 150 to the clamper 220 through the transport path A 50.

On the mounting plate 271, the lever 273 is disposed in a manner turnable around a turning shaft 273A, and the cam 274 is disposed in a manner rotatable around a rotation shaft 274A. The cam 274 is formed in a generally sector shape having two arcs 274a and 274b with different radiuses. The lever 273 is urged by an elastic member (not illustrated) in a direction for contacting with the cam 274 (clockwise in FIG. 16). Thereby, the lever 273 is turned in response to rotation of the cam 274.

If the arc 274b of the cam 274 contacts with the lever 273, a leading end of a pressing portion 273a at a leading end of the lever 273 protrudes through the elongate hole 272a to push the lenticular sheet 12, which is transported through the transport path A 50, toward the photosensors 320A to 320C (only the photosensor 320B is illustrated in FIG. 16), as illustrated in FIG. 16. Thereby, the detection by the photosensors 320A to 320C can be stabilized, and precision of the azimuth adjustment can be increased.

When position adjustment such as the azimuth adjustment is completed, the cam 274 rotates, and the arc 274a of the cam 274 is caused to contact with the lever 273. Thereby, the lever 273 is caused to retreat so that the pressing portion 273a does not contact with the lenticular sheet 12, as illustrated in FIG. 17.

The transport path switching member 275 is disposed to the frame 11 in a manner turnable around a rotation shaft 275A. A lever 278 is fixed to the transport path switching member 275 in a manner turnable around the rotation shaft 275A.

A piston 276a of a solenoid 276 is disposed on one end of the lever 278, and an urging spring 277 is disposed on the other end. The solenoid 276 is, for example, a pull-type solenoid, and is adapted so that the piston 276a is moved up and down. The urging spring 277 is, for example, a coil spring, whose one end is disposed on the lever 278 and the other end is disposed on the side of the solenoid 276.

The piston 276a is usually positioned at an upper end, as illustrated in FIG. 16. The transport path switching member 275 and the lever 278 are urged clockwise in FIG. 16, around the rotation shaft 275A by urging force of the urging spring 277. Thus, the transport path switching member 275 is arranged at a first position where the transport path switching member 275 does not intersect with the protective member 272, and the transport path A 50 is formed by the protective member 272, the transport path switching member 275, and a rib 50a.

When the solenoid 276 is turned on, the piston 276a is moved in a lower direction against the urging force of the urging spring 277. As a result, as illustrated in FIG. 17, the lever 278 turns counterclockwise in FIG. 17, around the rotation shaft 275A. Along with the turning of the lever 278, the transport path switching member 275 also turns counterclockwise around the rotation shaft 275A, and the transport path switching member 275 is arranged at a second position where the transport path switching member 275 intersects with the protective member 272. Thereby, the transport path B 51 is formed by the protective member 272, the transport path switching member 275, and ribs 51a.

The lenticular sheet 12 moved in the lower direction by the clamper 220 contacts with the transport path switching member 275, and bends along the transport path switching member 275. Subsequently, the lenticular sheet 12 falls under the sheet's own weight, and thereby, the lenticular sheet 12 is transported through the transport path B 51 to an outlet (not illustrated).

[Description of Control System of Printing Apparatus]

Next, the control system of the printing apparatus 10 with the above described configuration will be described.

FIG. 18 is a block diagram illustrating a configuration of a main portion of the printing apparatus 10.

The printing apparatus 10 includes the system controller 400, a program storage unit 402, a buffer memory 404, a sensor unit 406, an operation unit 408, a communication interface (communication I/F) 410, a control unit 420, a mechanical unit 430, a head driver 440 and the thermal head 260.

The system controller 400 is a unit which generally controls the respective units according to a 3D print program, and a CPU (central processing unit) or the like is conceivable as the system controller 400. The 3D print program is stored in the program storage unit 402 including a computer readable, nonvolatile storage medium such as a ROM (read-only memory). The system controller 400 reads and executes the program stored in the program storage unit 402 as appropriate.

The buffer memory 404 is a unit which temporarily stores photographic print data received from a personal computer (PC) (not illustrated) through the communication I/F 410.

The PC connected to the communication I/F 410 obtains color two-view images (left and right images) which are images of the same subject taken by a 3D camera (a camera configured to image a three dimensional image (parallax images)) or the like, and calculates a shift amount in a feature point where features coincide with each other (a shift amount between pixels (an amount of parallax)), for each pixel, from these left and right images. After the calculated amount of parallax is adjusted for a 3D print, the adjusted amount of parallax is interpolated to generate six-view images. The PC further performs color conversion of the six-view images of R, G and B, into Y, M and C, and generates a Y signal, an M signal and a C signal for one sheet from the six-view images subjected to the color conversion. These Y signal, M signal and C signal are stored as the photographic print data, in the buffer memory 404 from the PC through the communication I/F 410.

It should be noted that the above described image processing function of the PC may be included in the printing apparatus 10.

The sensor unit 406 includes the photosensors 320A to 320C illustrated in FIG. 14 and sensors which detect positions, rotation angles and the like of various members in the mechanical unit 430, and outputs the detection signal for each detection to the system controller 400.

The operation unit 408 includes a power switch, a print start switch, a switch which sets the number of sheets to be printed and the like, and the like. Signals generated by operations in the operation unit 408 are inputted to the system controller 400.

The mechanical unit 430 includes the sheet transport mechanism 431, a head moving mechanism 432, an ink ribbon drive mechanism 433, the cassette retreat mechanism 434, and the pressure plate drive mechanism 436.

The sheet transport mechanism 431 includes the feed roller 190, the transport roller 212, the capstan 214 and the clamper 220 illustrated in FIG. 1 and the like, as well as the clamper transport unit 230 including the drive motor 302 and the like (FIG. 13).

Moreover, the control unit 420 includes a sheet transport control unit 421, a head moving control unit 422, an ink ribbon control unit 423, and a cassette control unit 424.

The system controller 400 outputs each control signal to the control unit 420 depending on a photographic printing sequence, and controls to drive the mechanical unit 430 through the control unit 420.

Thereby, the sheet transport control unit 421 performs the transport so that the lenticular sheet 12 is outputted from the sheet feeding cassette 150 and also the lenticular sheet 12 is moved up/down in the photographic printing. Moreover, the sheet transport control unit 421 has the detection device (not illustrated) which detects the position of the feed roller 190 in the rotation direction, and causes the feed roller 190 to rotate depending on a detection result from the detection device, so as to control the position of the feed roller 190 in the rotation direction.

As described in FIG. 15, the head moving mechanism 432 causes an arm portion having the turning shaft on the same axis as the ribbon cage holder rocking shaft 252A, to turn, and thereby moves the thermal head 260 disposed at a leading end of the arm portion, between the photographic printing position where the thermal head 260 is caused to contact with the platen roller 262, and the retreat position. It should be noted that the retreat position includes a small retreat position and a large retreat position. If only the ink ribbon is fed to perform cueing of the ink, the thermal head 260 is moved to the small retreat position where the thermal head 260 is caused to slightly retreat from the platen roller 262. If the ribbon cage 254 is rotated to switch the ink ribbon to another color ink ribbon, the thermal head 260 is moved to the large retreat position where the thermal head 260 does not interfere with the ink ribbons set at the take-up reels 255 and the supply reels 256.

The ink ribbon drive mechanism 433 includes a mechanism which causes the ribbon cage 254 in the ribbon switching gatling mechanism 250 illustrated in FIG. 15 to rotate, and a reel drive mechanism which drives the five pairs of the take-up reels 255 and the supply reels 256 disposed in the ribbon cage 254.

The cassette retreat mechanism 434 includes the solenoid 122 and the like as described in FIGS. 2 to 4, and rocks the sheet storage main body 110 in response to a command from the system controller 400.

The pressure plate drive mechanism 436 moves the pressure plate 112 as described in FIG. 9, and moves the pressure plate 112 in response to the command from the system controller 400, so that certain pressing force is applied to the lenticular sheets 12 within the cassette.

In the thermal head 260, many heating elements are arranged in a direction orthogonal to a transport direction of the lenticular sheet 12. Based on the photographic print data stored in the buffer memory 404, the system controller 400 controls a temperature of each heating element through the head driver 440 so that a concentration is set corresponding to the photographic print data per line, and sublimates the ink on the ink ribbon to transfer the ink to the lenticular sheet 12, and subsequently, feeds the lenticular sheet 12 by one line by the sheet transport mechanism 431, and continuously causes thermal transfer for each line in a similar manner.

[Description of Operations of Printing Apparatus]

Next, operations of the printing apparatus 10 will be described.

Figure 19A:
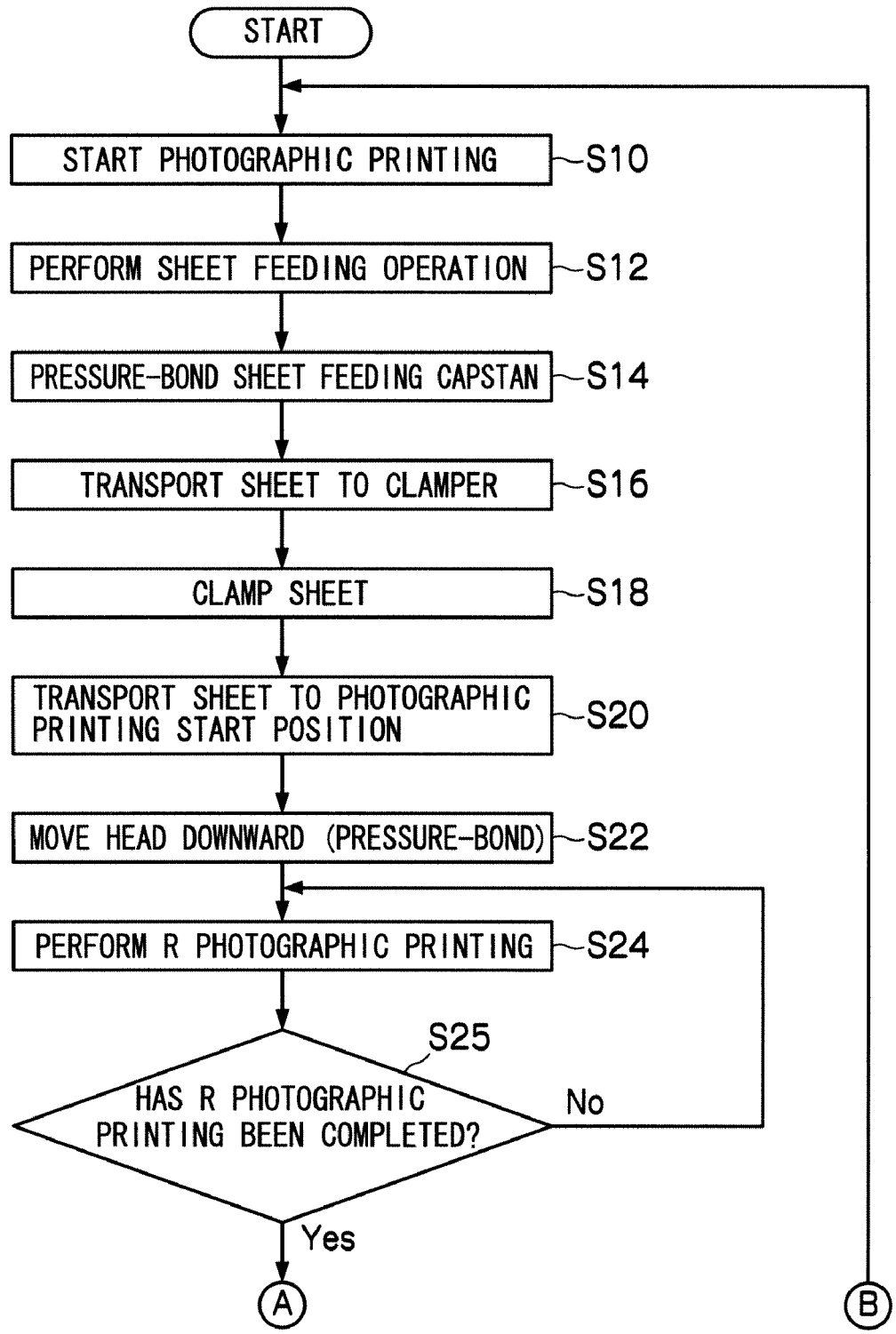
FIG. 19A is a flowchart of a photographic printing process.
Figure 19B:
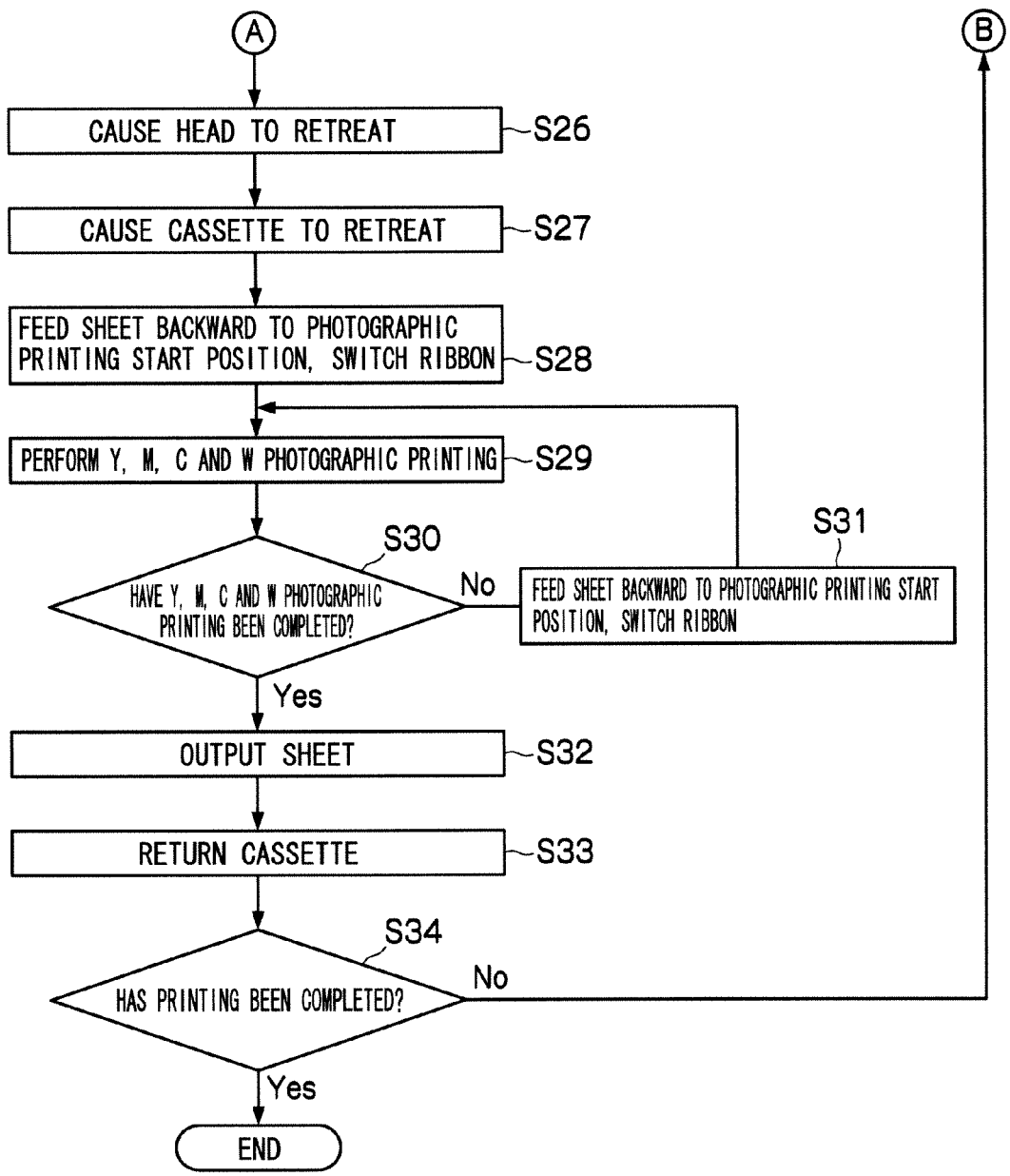
FIG. 19B is a flowchart of a photographic printing process.

FIGS. 19A and 19B are flowcharts illustrating processing operations in the photographic printing in the printing apparatus 10. Hereinafter, the processing operations will be described according to this flowchart. This photographic printing process is controlled by the system controller 400. A program which causes the system controller 400 to execute this photographic printing process is stored in the program storage unit 402.

[Step S10]

After the photographic print data for the 3D print is stored in the buffer memory 404, from the PC through the communication I/F 410, when the print start switch of the operation unit 408 is turned on, the photographic printing is started. It should be noted that an instruction to start the photographic printing or the like may be inputted and outputted from the PC connected to the communication I/F 410.

[Step S12]

When the instruction to start the photographic printing is issued, the system controller 400 first causes the feed roller 190 to perform one rotation, and feeds the lenticular sheet 12 from the sheet storage main body 110 by the certain amount. At this time, the leading end of the lenticular sheet 12 reaches the transport roller 212.

[Step S14]

The system controller 400 pressure-bonds the capstan 214 to the transport roller 212 so that the lenticular sheet 12 is clamped between the transport roller 212 and the capstan 214. It should be noted that the capstan 214 may be previously pressure-bonded to the transport roller 212, and the lenticular sheet 12 may be inserted between the transport roller 212 and the capstan 214 when the lenticular sheet 12 is fed in step S12.

[Step S16]

Subsequently, the system controller 400 drives the transport roller 212 for a certain period of time, and transports the lenticular sheet 12 to the clamper 220. At this time, the clamper 220 is waiting at the predetermined lowest position, and when the leading end of the lenticular sheet 12 contacts with the clamper 220, the transport roller 212 idles. Moreover, rough positioning of the lenticular sheet 12 is performed by causing the lenticular sheet 12 to contact with the clamper 220.

[Step S18]

The system controller 400 drives the cam and the like to close the pair of clamp members by the urging force of the spring, and causes the clamper 220 to clamp the lenticular sheet 12. Subsequently, the azimuth adjustment is performed as described in FIG. 13.

[Step S20]

The system controller 400 drives the clamper transport unit 230 to transport the lenticular sheet 12 clamped by the clamper 220, to the photographic printing start position. The photographic printing start position can be, for example, a position where the signals outputted by the photosensors 320A to 320C illustrated FIG. 14 reach a predetermined value (for example, a peak value) after the lenticular sheet 12 is transported. Thereby, relative positions of a lens position of the lenticular sheet 12 and the photographic printing position of the six-view images are adjusted.

[Step S22]

The system controller 400 controls the head moving mechanism 432 through the head moving control unit 422 to bring the thermal head 260 in pressure contact with the platen roller 262 while the R ink ribbon and the lenticular sheet 12 are sandwiched between the thermal head 260 and the platen roller 262.

[Step S24]

Figure 20:
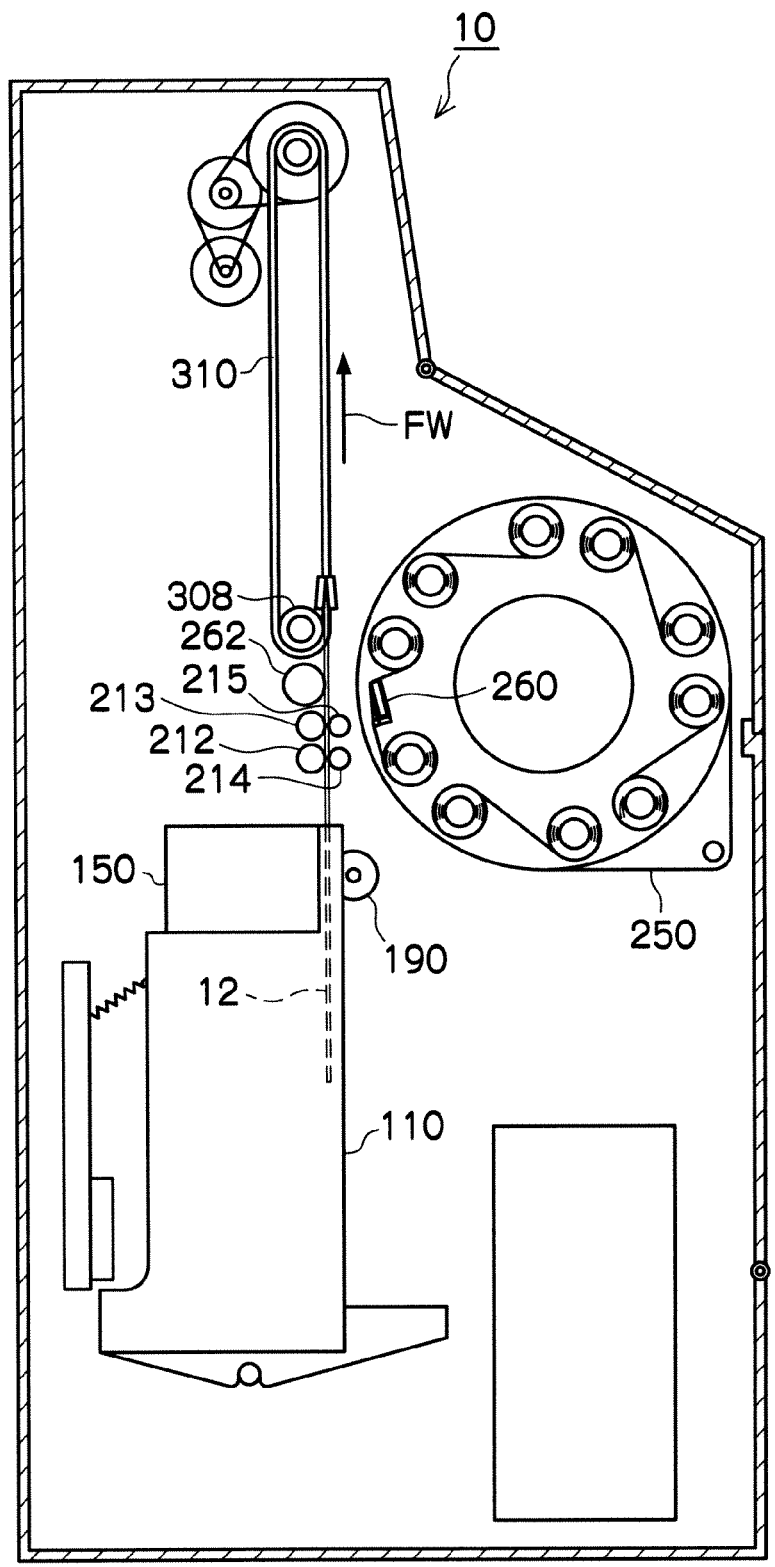
FIG. 20 is an internal perspective view schematically representing the inside of the printing apparatus when the photographic print medium is fed.

The system controller 400 causes the drive motor 302 to rotate through the sheet transport control unit 421 so as to drive the clamper 220, and moves the lenticular sheet 12 forward in a photographic printing direction FW, as illustrated in FIG. 20. In synchronization with the moving of the lenticular sheet 12, while the ink ribbon drive mechanism 433 causes the take-up reel 255 to take up the ink ribbon at the speed which is slightly faster than the moving speed of the lenticular sheet 12, the thermal head 260 is energized and caused to generate heat, and the receiving layer is transferred from the R ink ribbon to the lenticular sheet 12.

[Step S25]

The system controller 400 determines whether or not formation of the receiving layer with the R ink ribbon has been completed. For example, the system controller 400 makes this determination depending on whether or not the lenticular sheet 12 has been fed by a predetermined amount from the photographic printing start position. If Yes, the process proceeds to S26, and if No, the process returns to S24.

[Step S26]

After the transfer of the receiving layer is completed, the system controller 400 controls the head moving mechanism 432 through the head moving control unit 422 to move the thermal head 260 to the position where the thermal head 260 does not interfere with the ink ribbon.

[Step S27]

Figure 21:
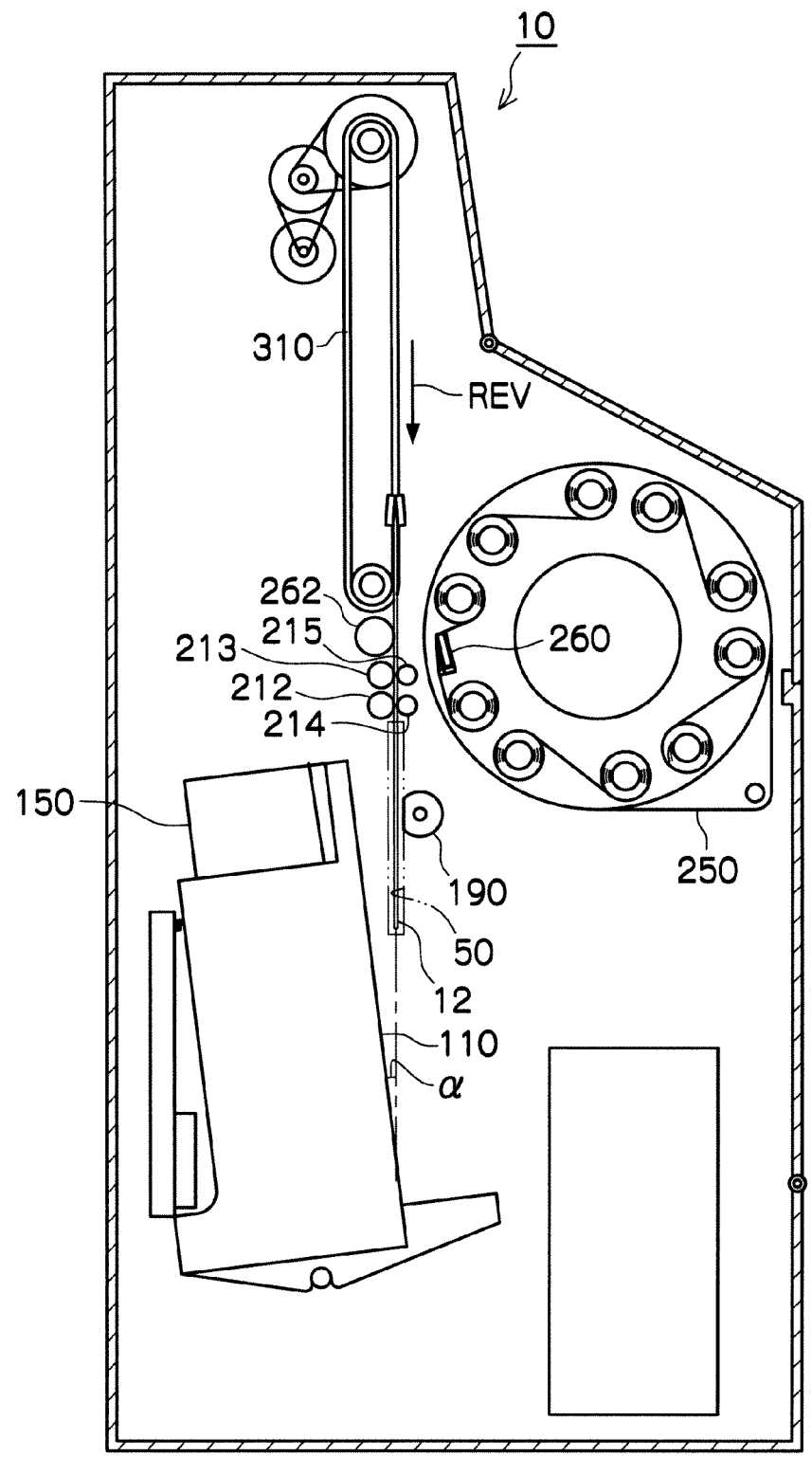
FIG. 21 is an internal perspective view schematically representing the inside of the printing apparatus when the photographic print medium is returned.

The system controller 400 controls the cassette retreat mechanism 434 through the cassette control unit 424 to move the sheet storage main body 110 from an initial position to a retreat position where the sheet storage main body 110 is caused to retreat from the transport path 50, and causes the sheet storage main body 110 to be retained at the retreat position, as illustrated in FIG. 21.

In other words, when the energization to the solenoid 122 is turned off by the system controller 400, the urging force from the link mechanism 124 is eliminated from the sheet storage main body 110, and the sheet storage main body 110 is urged by the force in the direction of counterclockwise rotation around the rotation shaft 120, by the urging spring 125. If the piston 122a is positioned at an lower end, force of the link mechanism 124 pressing the sheet storage main body 110 is eliminated, and the sheet storage main body 110 is turned counterclockwise around the rotation shaft 120 by the urging force of the urging spring 125, and is retained at a position where the sheet storage main body 110 is turned by a predetermined angle α. Thereby, the sheet storage main body 110 is caused to retreat from the transport path 50.

[Step S28]

The system controller 400 controls the sheet transport mechanism 431 through the sheet transport control unit 421 to start to move the lenticular sheet 12 in a reverse direction REV which is opposed to the photographic printing direction FW, that is, from the thermal head 260 toward the sheet storage main body 110, and continues to move the lenticular sheet 12 until the lenticular sheet 12 reaches the printing start position (cue position). Since the sheet storage main body 110 is tilted by the predetermined angle in step S27, the lenticular sheet 12 does not interfere with the sheet feeding cassette 150.

Moreover, the system controller 400 controls the ink ribbon drive mechanism 433 through the ink ribbon control unit 423 to cause the ribbon switching gatling mechanism 250 to rotate to a position of the ink ribbon of color which is set first. Here, the first color is Y, which, however, may be another color. Moreover, the ink ribbon of the color other than Y may be employed.

[Step S29]

The system controller 400 brings the thermal head 260 in pressure contact with the platen roller 262 while the switched ink ribbon and the lenticular sheet 12 are sandwiched between the thermal head 260 and the platen roller 262, by the head moving mechanism 432. Subsequently, the system controller 400 causes the drive motor 302 to rotate so as to drive the clamper 220, and moves the lenticular sheet 12 forward in the photographic printing direction FW. In synchronization with the moving of the lenticular sheet 12, while the ink ribbon drive mechanism 433 causes the take-up reel 255 to take up the ink ribbon at the speed which is slightly faster than the moving speed of the lenticular sheet 12, the thermal head 260 is energized and caused to generate heat, a heated color material is transferred from the color ink ribbon to the photographic print surface of the lenticular sheet 12, and the image is formed.

[Step S30]

The system controller 400 determines whether or not the transfer of all the colors with the color ink ribbons which have been set is completed. This determination can be made similarly to the above described step S25. If Yes, the process proceeds to S32, and if No, the process proceeds to S31.

[Step S31]

The system controller 400 controls the sheet transport mechanism 431 through the sheet transport control unit 421 to move the lenticular sheet 12 in the reverse direction REV until the lenticular sheet 12 reaches the printing start position (cue position).

Moreover, the system controller 400 controls the ink ribbon drive mechanism 433 through the ink ribbon control unit 423 to cause the ribbon switching gatling mechanism 250 to rotate to the position of the ink ribbon of the color which is set next. Here, while the ribbon switching gatling mechanism 250 is rotated in order of Y, M, C and W, the rotation may be performed in another order. Moreover, ink ribbons of colors other than Y, M, C and W may be employed. After cueing of the sheet and the switching of the ink ribbon, the process returns to S29, and the color is transferred to the photographic print surface of the lenticular sheet 12 with the ink ribbon set next. Subsequently, similarly, the photographic printing with the ink ribbon of the set color, the determination of the completion of the photographic printing with the ink ribbon, as well as the switching of the ink ribbon and the cueing of the lenticular sheet 12 depending on the determination of the completion of the photographic printing are performed for the ink ribbons of all the colors.

[Step S32]

After the photographic printing of all the colors, the system controller 400 causes the lenticular sheet 12 to be guided to the transport path B 51 by a pushing mechanism 270. Certain areas at front and back end portions of the lenticular sheet 12 transported through the transport path B 51 are cut by a cutter (not illustrated), and the lenticular sheet 12 is outputted from the frame 11 by an output mechanism (not illustrated). Thereby, the photographic printing operation is completed. It should be noted that any output mechanism may be employed.

[Step S33]

The system controller 400 controls the cassette retreat mechanism 434 through the cassette control unit 424 to move the sheet storage main body 110 from the retreat position to the initial position.

[Step S34]

The system controller 400 determines whether or not the photographic printing has been completed for all the sheets. If Yes, this process is completed. If No, the system controller 400 controls the cassette retreat mechanism 434 through the cassette control unit 424 to retain the sheet feeding cassette 150 stored in the sheet storage main body 110, at the vertical position.

In other words, when the energization to the solenoid 122 is turned on by the system controller 400, the sheet storage main body 110 is urged by the force in the direction of the clockwise rotation around the rotation shaft 120, by the link mechanism 124. The sheet storage main body 110 is turned clockwise around the rotation shaft 120 by the predetermined angle α (for example, 30°), against the urging force of the urging spring 125, and the sheet storage main body 110 stops at the vertical position (initial position) on the transport path 50. Thereby, similarly to FIG. 1, the sheet storage main body 110 returns to the vertical position.

Therefore, the lenticular sheet 12 can be transported through the straight path in the first photographic printing operation (FIG. 20), the return operation (FIG. 21), and the next photographic printing operation (FIG. 20) for the lenticular sheet 12, and also, shortening of the transport path for the lenticular sheet 12 (downsizing of the apparatus) is attempted.

Then, the process returns to S10, and the feeding of the next sheet is started.

As described above, according to the present embodiment, the lenticular sheet is pressure-bonded to the feed roller with the predetermined pressure by the pressure plate. Therefore, the lenticular sheet can be outputted from the sheet storage main body by the rotation of the feed roller, and can be fed to the transport path.

Moreover, in the present embodiment, the pressure plate is formed to be generally L-shaped, and the pressure plate is slid in the front direction or the rear direction in the state where the lenticular sheets are placed on the bottom portion. Therefore, even if the lenticular sheets are stacked and become heavy (for example, 2 to 4 kg), the lenticular sheets can be pressure-bonded to the feed roller.

Moreover, according to the present embodiment, since the feed roller is formed to be generally cross-sectionally D-shaped, the feed roller and the lenticular sheet do not interfere with each other, and the sheet feeding cassette, that is, the lenticular sheets can be loaded in the sheet storage main body. Moreover, since the feed roller is generally cross-sectionally D-shaped, the lenticular sheet can be fed from the sheet feeding cassette by the certain amount when the feed roller is caused to perform one rotation. Therefore, when the leading end of the lenticular sheet is caused to reach the transport roller, subsequently, the lenticular sheet is not transported by the feed roller, and thus, the lenticular sheet can be prevented from being transported by both the feed roller and the transport roller.

Moreover, according to the present embodiment, the rocking of the rear portion of the pressure plate is detected, and when the rocking is detected, the pressure plate is moved parallel in the front direction. Therefore, the position of the pressure plate can be controlled so that the pressure plate constantly presses the lenticular sheets with the certain pressure.

Moreover, according to the present embodiment, since the pushing portion and the feed roller are disposed to face each other, the lenticular sheet can be appropriately pressure-bonded to the feed roller.

It should be noted that, in the present embodiment, the rear portion 112b of the pressure plate 112 is rockably disposed, and the pushing plate 112d disposed at the rear portion 112b presses the lenticular sheets 12. However, the rear portion 112b and the bottom portion 112a may be fixed so that the entire rear portion 112b presses the lenticular sheets 12. In this case, even if the lenticular sheet 12 curls or skews, the lenticular sheet 12 can be flattened by the pressure plate 112, and the lenticular sheet 12 can be outputted from the sheet feeding cassette 150.

Figure 22:
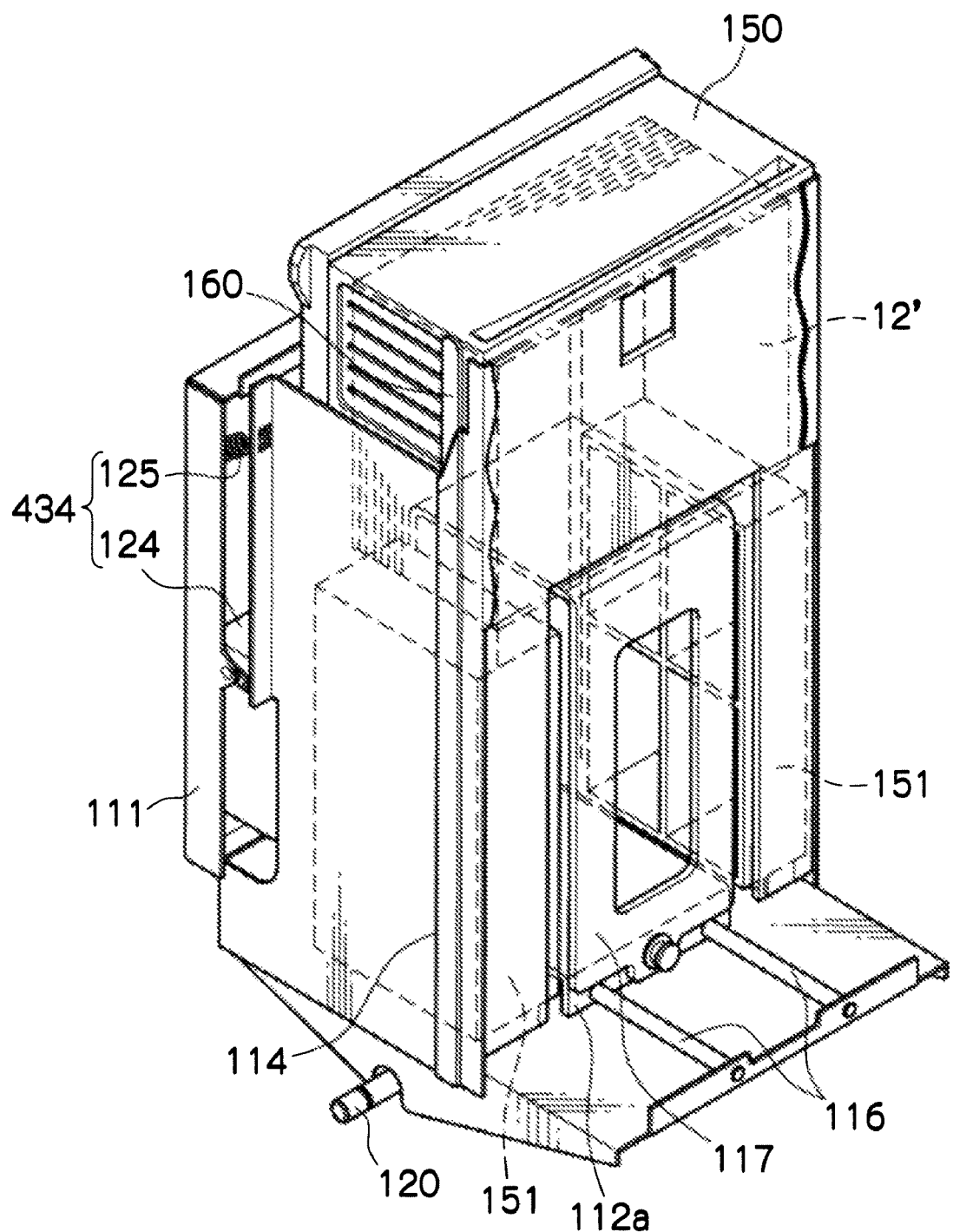
FIG. 22 is a perspective view of another embodiment of the sheet feeding cassette in which the lenticular sheets are inserted.

Moreover, in the present embodiment, the lenticular sheets 12 are placed on the bottom portion 112a. However, lenticular sheets of different sizes can be accepted by using additional parts as illustrated in FIG. 22. FIG. 22 is a perspective view of the main portion in a case where lenticular sheets 12' smaller than the lenticular sheets 12 are used.

A raising member 117 which adjusts a height of the bottom portion 112a is disposed on the top of the bottom portion 112a, in accordance with a size of the lenticular sheet 12'.

Adjustment members 151 which adjust a height of the sheet feeding cassette 150 are inserted in both ends within the sheet feeding cassette 150, in accordance with the size of the lenticular sheet 12'. When the adjustment members 151 are inserted, the lenticular sheets 12' are inserted on the adjustment members 151 within the sheet feeding cassette 150.

When the sheet feeding cassette 150 in which the lenticular sheets 12' are inserted is inserted into the sheet storage main body 110 (not illustrated in FIG. 22), a height of the lenticular sheets 12' is raised by the raising member 117, and also, the pressure plate 112 (not illustrated in FIG. 22) is moved in the front direction by the pressure plate drive mechanism 436 (not illustrated in FIG. 22), and the pushing plate 112d (not illustrated in FIG. 22) presses the lenticular sheets 12' within the sheet feeding cassette 150.

Thereby, the lenticular sheet 12' can be outputted from the sheet feeding cassette 150. The same apparatus can be used to accept lenticular sheets of various sizes, by preparing raising members and adjustment members of various sizes corresponding to the lenticular sheets of various sizes.

Moreover, in the present embodiment, the sheet storage main body 110 is retained at the retreat position until the printing operation is completed. However, the sheet storage main body 110 may be caused to retreat from the transport path 50 each time the lenticular sheet 12 returns to the cue position in the photographic printing with each color ink ribbon, and the sheet storage main body 110 may be retained at the initial position except when the lenticular sheet 12 is returned to the cue position.

Figure 23:
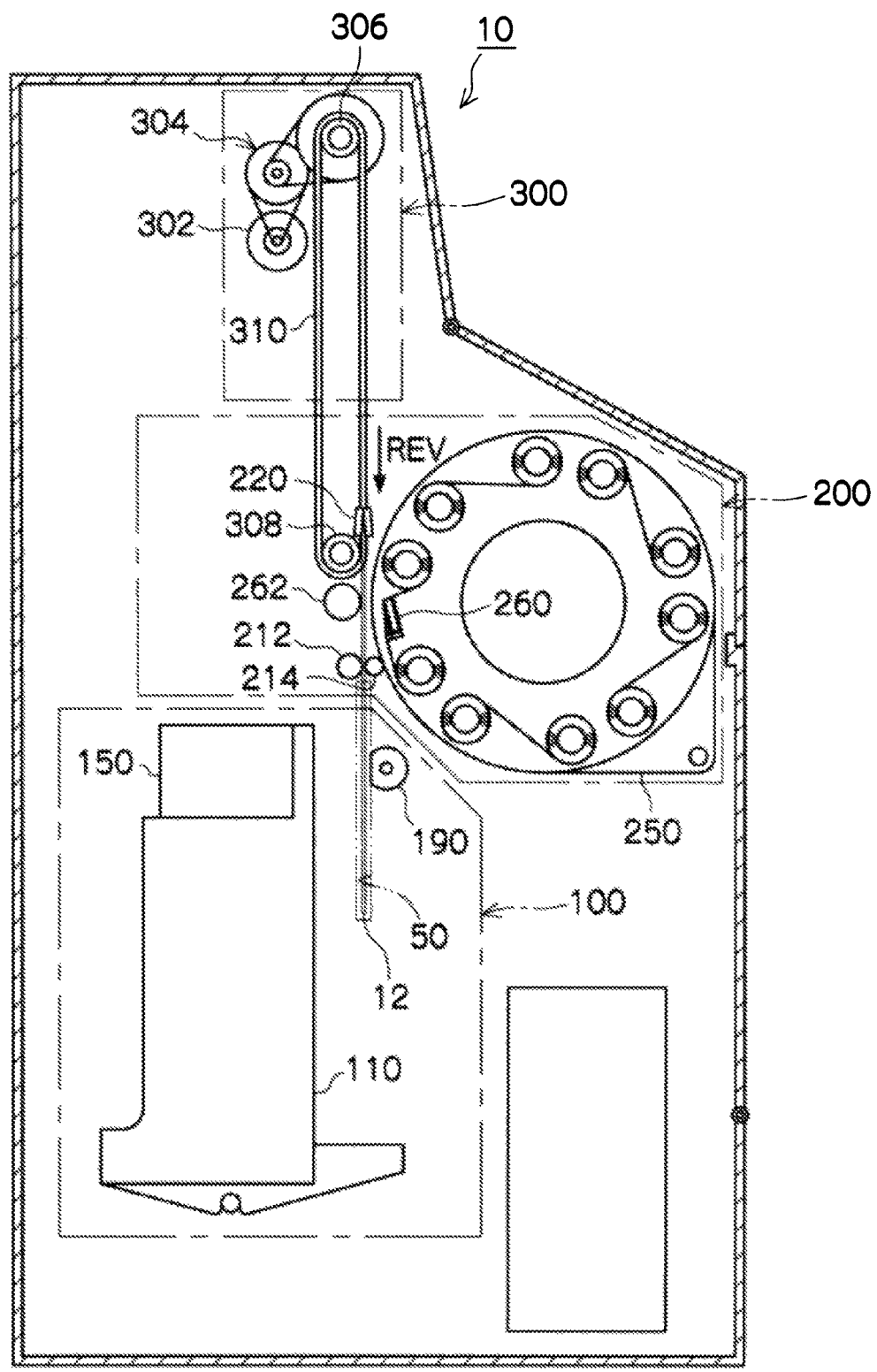
FIG. 23 is an internal perspective view schematically representing another example of the inside of the printing apparatus when the photographic print medium is fed back.

Moreover, instead of causing the cassette to retreat from the transport path 50 by the turning, the sheet feeding cassette 150 may be caused to retreat from the transport path 50 by a moving mechanism which moves the sheet feeding cassette 150 from the transport path 50, in a vertical direction, in a horizontal direction, or in the both directions. In FIG. 23, the sheet storage main body 110 is moved from the transport path 50 in the horizontal direction, and thereby caused to retreat from the transport path 50.

Moreover, in the present embodiment, the receiving layer is transferred from the R ink ribbon at the thermal head 260. However, instead of transferring the receiving layer from the R ink ribbon at the thermal head 260, the receiving layer may be previously formed on the lenticular sheet 12. In this case, steps S24 to S27 of the flowcharts illustrated in FIGS. 19A and 19B are omitted. Instead, after the color transfer with the first color ink ribbon, for example, the Y ink ribbon, is completed, the cassette is caused to retreat similarly to S27, and the transfer with the next color ink ribbon is performed.

It should be noted that the scope of application of the presently disclosed subject matter is not limited to the sublimation printer using the ink ribbons, and the photographic print medium is not limited to the lenticular sheet having the lens surface and the photographic print surface, either. For example, if the azimuth adjustment is enabled without detecting the lens position by the photosensors, the photographic printing may be performed for a medium which has only the photographic print surface and to which the lens surface is not applied. The presently disclosed subject matter is also applicable to various methods in which an image is formed on a print medium while the print medium is reciprocated along the transport path (for example, a thermo-autochrome (TA) printer, an ink jet printer, a thermofusible transfer method, a silver halide photography (thermal development transfer) method, and ZeroInk (registered trademark of Japan)).

What is claimed is:

1. A sheet feeding apparatus, comprising:
   a box-shaped sheet storage unit into which a resin sheet is inserted through a sheet inlet in a manner that a surface of the resin sheet is parallel to a vertical direction, the sheet storage unit having a first opening portion formed on a front of the sheet storage unit, a second opening portion formed on a rear of the sheet storage unit, and a third opening portion formed on a top of the sheet storage unit;
   a generally L-shaped pressure plate having a bottom portion on which the sheet inserted into the sheet storage unit is placed, and a rear portion formed on rear of the bottom portion, the generally L-shaped pressure plate being disposed in a manner slidable in front and rear directions;
   a moving device configured to slide the pressure plate in the front direction so that the rear portion presses the sheet through the second opening portion; and
   a roller rotatably disposed so as to contact with the sheet through the first opening portion, the roller moving the sheet in a vertical upward direction in response to rotation of the roller, to output the sheet through the third opening portion.

2. The sheet feeding apparatus according to claim 1, wherein
   a pushing portion is disposed on the rear portion through an elastic member so as to face the first opening portion, and
   the sheet feeding apparatus further comprises:
   a coupling device configured to rockably couple the rear portion to the bottom portion; and
   a pressing device configured to press the rear portion toward the front.

3. The sheet feeding apparatus according to claim 2, further comprising:
   a rocking detection device configured to detect rocking of the rear portion; and
   a first control device configured to slide the pressure plate in the front direction by the moving device when the rocking is detected by the rocking detection device.

4. The sheet feeding apparatus according to claim 1, wherein
   a flat surface is formed on the roller so that the roller is generally cross-sectionally D-shaped.

5. The sheet feeding apparatus according to claim 4, wherein
   the sheet storage unit includes a cassette in which a plurality of the sheets are stacked and inserted, and a main body portion in which the cassette is loaded, and
   the sheet feeding apparatus further comprises:
   a loading detection device configured to detect whether or not the cassette is loaded in the main body portion;
   a rotation device configured to cause the roller to rotate;
   a second control device configured to control the rotation device; and
   a position detection device configured to detect a position of the roller in a rotation direction, and
   wherein, if the loading detection device detects that the cassette is not loaded in the main body portion, the second control device controls the rotation device to cause the roller to rotate so that the flat surface faces the sheet, based on a result of the detection performed by the position detection device.

6. The sheet feeding apparatus according to claim 5, wherein
   a ridge is formed on the cassette, and
   a groove which engages with the ridge is formed on the main body portion.

7. The sheet feeding apparatus according to claim 1, wherein
   the third opening portion is formed to have a width which is thicker than a thickness of the sheet and thinner than a thickness of two of the sheets.

8. The sheet feeding apparatus of claim 7, wherein the third opening is formed to have the width thicker than one sheet in a center portion of the third opening and to have the width thinner than the thickness of two sheets at ends of the third opening.

9. A printing apparatus, comprising:
   a sheet feeding apparatus according to claim 1; and
   an image forming unit configured to form an image on the sheet outputted from the sheet storage unit by the sheet feeding apparatus.

10. The sheet feeding apparatus of claim 1, wherein said resin sheet comprises a transparent resin photographic print medium with a lens surface having lenticular lens with a hog-backed lens group on a first surface and a photographic print surface on a second surface opposite said first surface, thereby a three-dimensional image can be provided with said resin sheet by imprinting an image on said second surface.

11. A sheet feeding cassette, comprising:
    a box-shaped sheet storage portion into which sheets can be inserted therein through a front side of the storage portion; and
    a cassette cover, hinged to the box-shaped sheet storage portion at a bottom edge on the front side of the sheet storage portion so that the cassette cover can be opened for inserting sheets into the box-shaped sheet storage portion, the cassette cover having an opening through which a pressure plate can enter when the cassette cover is closed, to press stored sheets toward a rear direction of the sheet storage portion, the sheet storage portion having a sheet outlet opening formed on a top surface of the sheet storage portion, through which a sheet can pass, the sheet storage portion having a feeder roller opening formed on a rear surface of the sheet storage portion, through which a feeder roller can enter to move a sheet through the sheet outlet opening, and the sheet storage portion having an opening on a bottom surface, so that bottom edges of the sheets are partially exposed, wherein the sheet storage portion further comprises a ridge on each of two side surfaces, to engage grooves formed on a sheet storage main body designed to accept said sheet feeding cassette in a manner that the feeder roller opening aligns with the feeder roller.

12. The sheet feeding cassette of claim 11, wherein the sheets comprise resin sheets and the sheet outlet opening is formed to have an opening width slightly greater than one resin sheet in a center portion of the sheet outlet opening and to have an opening width slightly less than a thickness of two resin sheets at end portions of the sheet outlet opening, so that only a single sheet at a time can pass through the sheet outlet opening.

13. A printing apparatus, comprising:
a sheet feeding apparatus in which is inserted the sheet feeding cassette of claim 11; and
an image forming unit configured to form an image on a sheet outputted from the sheet outlet opening.

14. The printing apparatus according to claim 13, the sheet feeding apparatus comprising:
a box-shaped main body into which the sheet feeding cassette is inserted in a generally vertical direction through a top opening of the main body, the main body being rockably attached to the printing apparatus using a rotation shaft;
a generally L-shaped pressure plate having a bottom portion, on which the sheet feeding cassette is placed when inserted into the main body, and a rear portion formed on a rear edge of the bottom portion of the generally L-shaped pressure plate, the generally L-shaped pressure plate being disposed in a manner slidable in front and rear directions of the main body, to enter into the opening of the cassette door of the sheet feeding cassette;
a moving device configured to slide the pressure plate in a direction so that the rear portion presses against sheets in the sheet feeding cassette, through the opening of the sheet feeding cassette cover; and
a feeder roller disposed so as to selectively contact with a sheet in the sheet feeding cassette, through the feeder roller opening of the sheet storage portion of the sheet feeding cassette, the feeder roller, upon a rotation, moving the sheet in a vertical direction, to output the sheet through the sheet outlet opening.

15. The printing apparatus of claim 14, wherein the feeder roller is formed with a flat surface so that the feeder roller is generally cross-sectionally D-shaped.

16. The printing apparatus of claim 15, wherein the sheet feeding apparatus further comprises:
a loading detection device configured to detect whether or not the sheet feeding cassette is loaded in the main body;
a rotation device configured to cause the feeder roller to rotate;
a feeder roller control device configured to control the rotation device; and
a position detection device configured to detect a position of the roller in a rotation direction, and
wherein, if the loading detection device detects that the sheet feeding cassette is not loaded in the main body, the feeder roller control device controls the rotation device to cause the feeder roller to rotate so that the flat surface faces the sheet, based on a result of the detection performed by the position detection device.

17. The printing apparatus of claim 14, wherein the sheet storage portion of the sheet feeding cassette comprises ridges on side surfaces thereof, and the sheet storage main body comprises grooves to engage the ridges on the side surfaces of the sheet feeding cassette, so that the feeder roller opening aligns with the feeder roller when the sheet feeding cassette is inserted into the sheet storage main body.

18. The printing apparatus of claim 14, further comprising:
a rocking detection device configured to detect a rocking of the main body; and
a pressure plate control device configured to controllably slide the pressure plate by the moving device based upon when the rocking is detected by the rocking detection device.

19. The printing apparatus of claim 14, further comprising a main body rotation mechanism to control a rocking position of the main body about its rotation shaft.

* * * * *